US012770325B2

(12) United States Patent
Kanaya

(10) Patent No.: US 12,770,325 B2
(45) Date of Patent: Oct. 20, 2026

(54) INFORMATION PROCESSING METHOD, SERVER, AND INFORMATION PROCESSING SYSTEM

(71) Applicant: GREE, Inc., Tokyo (JP)

(72) Inventor: Yosuke Kanaya, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 187 days.

(21) Appl. No.: 18/399,747

(22) Filed: Dec. 29, 2023

(65) Prior Publication Data

US 2024/0378802 A1 Nov. 14, 2024

(30) Foreign Application Priority Data

May 10, 2023 (JP) ................................ 2023-077677

(51) Int. Cl.
*G06T 17/00* (2006.01)
*G06F 16/955* (2019.01)

(52) U.S. Cl.
CPC .......... *G06T 17/00* (2013.01); *G06F 16/9566* (2019.01)

(58) Field of Classification Search
CPC ............................ G06T 17/00; G06F 16/9566
See application file for complete search history.

(56) References Cited

U.S. PATENT DOCUMENTS

| | | | | |
|---|---|---|---|---|
| 5,926,179 A * | 7/1999 | Matsuda | G06F 3/0481 715/236 |
| 11,233,799 B1 * | 1/2022 | Whyte | G06F 21/44 |
| 2009/0132349 A1 * | 5/2009 | Berkley | G06Q 30/02 709/219 |
| 2014/0229544 A1 * | 8/2014 | Evans | G06F 16/9535 709/204 |
| 2019/0158774 A1 * | 5/2019 | Igarashi | G06T 19/00 |
| 2020/0106900 A1 * | 4/2020 | Ando | H04N 1/00474 |
| 2020/0351560 A1 * | 11/2020 | Kiyooka | H04N 21/4784 |
| 2022/0417201 A1 * | 12/2022 | Sato | H04L 51/42 |
| 2023/0018985 A1 * | 1/2023 | Hardy | H04N 21/472 |
| 2023/0274500 A1 * | 8/2023 | Kikuchi | G06T 17/00 345/419 |
| 2023/0394759 A1 * | 12/2023 | Aoki | A63F 13/31 |
| 2024/0086142 A1 * | 3/2024 | Singh | G06V 10/94 |
| 2024/0185514 A1 * | 6/2024 | Singh | G06F 3/013 |
| 2024/0202779 A1 * | 6/2024 | Inayoshi | G06Q 30/0269 |
| 2024/0404206 A1 * | 12/2024 | Chiu | G06F 3/04815 |
| 2025/0124099 A1 * | 4/2025 | Zhang | G06F 16/957 |

FOREIGN PATENT DOCUMENTS

JP 2015-184689 A 10/2015

* cited by examiner

*Primary Examiner* — Yu Chen
(74) *Attorney, Agent, or Firm* — XSENSUS LLP

(57) ABSTRACT

An information processing method comprises outputting a virtual space screen to a display, the virtual space screen including an image of a virtual space and a URL registration display for registering a URL of a resource associated with a link target in the virtual space; recording in a memory, in a case that a selection of the URL registration display by a user is received, the URL of the resource associated with the link target in a manner associated with the user; acquiring the URL recorded in the memory in response to a call-up instruction by the user; outputting a screen, including a hyperlink of the acquired URL, as a separate screen from the virtual space screen; accepting selection of the hyperlink by the user; acquiring the resource corresponding to the hyper-link; and outputting a screen, using the acquired resource, to the display.

20 Claims, 15 Drawing Sheets

INFORMATION PROCESSING METHOD, SERVER, AND INFORMATION PROCESSING SYSTEM

CROSS-REFERENCE TO RELATED APPLICATION

The present application is a continuation of and claims priority to JP 2023-077677, filed in Japan on May 10, 2023, the entire contents of which is incorporated by reference.

TECHNICAL FIELD

The present disclosure relates to a program, an information processing method, a server, an information processing method of the server, and an information processing system.

BACKGROUND

Conventionally, there is a system in which an animation of a character object is generated based on movements of a user, and a moving image including the animation of this character object may be distributed. Virtual spaces created are provided which are like the real world, including cities, event sites, and so forth. Such virtual spaces enable exhibits to be viewed at an event site, and so forth.

SUMMARY

In an exemplary implementation of the present disclosure, an information processing method comprises outputting a virtual space screen to a display, the virtual space screen including an image of a virtual space and a URL registration display for registering a URL of a resource associated with a link target in the virtual space; recording in a memory, in a case that a selection of the URL registration display by a user is received, the URL of the resource associated with the link target in a manner associated with the user; acquiring the URL recorded in the memory in response to a call-up instruction by the user; outputting a screen, including a hyperlink of the acquired URL, as a separate screen from the virtual space screen; accepting selection of the hyperlink by the user; acquiring the resource corresponding to the hyperlink; and outputting a screen, using the acquired resource, to the display.

DETAILED DESCRIPTION

Figure 1:
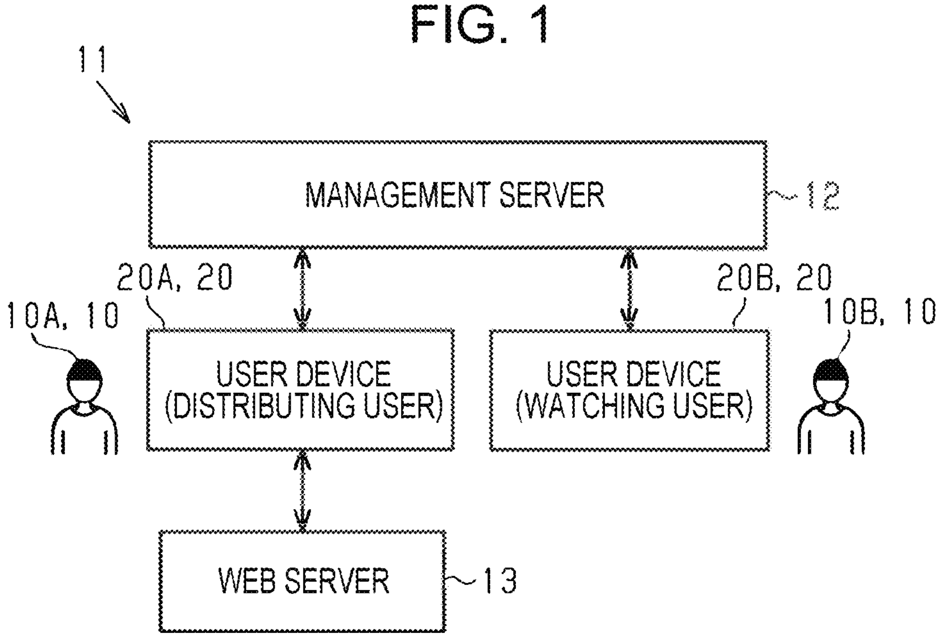
FIG. 1 is a schematic diagram illustrating an embodiment of an information processing system according to a first embodiment.

The inventors of the present disclosure have recognized that objects of a presentation, such as exhibits in a virtual space or the like, sometimes have detailed information or accompanying information (resources) provided on the Internet. Examples of resources include detailed information of exhibits, websites where the exhibits can be purchased, and so forth. The inventors have developed the technology of the present disclosure to enable users to collect such information while searching in the virtual space may enable users to efficiently collect information. This may be advantageous for presenters presenting objects of presentation such as exhibits and so forth in virtual space, through increased publicity effects.

In an exemplary implementation of the present disclosure, a program for solving the above problem causes one or a plurality of computers to function as a first output control unit that outputs an image of a virtual space, and a virtual space screen including a URL registration display for registering a URL of a resource associated with a link target in the virtual space, to a display unit, an identification information registration unit that, in a case of accepting selection of the URL registration display by a user, records the URL of the resource associated with the link target in a storage unit, in a manner associated with the user, an identification information acquisition unit that acquires the URL recorded in the storage unit in response to a callup instruction by the user, a second output control unit that outputs a screen including a hyperlink of the URL acquired by the identification information acquisition unit as a separate screen from the virtual space screen, a resource acquisition unit that accepts selection of the hyperlink by the user, and acquires the resource corresponding to the hyperlink, and a third output control unit that outputs a screen, using the resource that is acquired, to the display unit.

In an exemplary implementation of the present disclosure, an information processing method for solving the above problem is an information processing method of one or a plurality of computers executing first output control processing of outputting an image of a virtual space, and a virtual space screen including a URL registration display for registering a URL of a resource associated with a link target in the virtual space, to a display unit, identification information registration processing of, in a case of accepting selection of the URL registration display by a user, recording the URL of the resource associated with the link target in a storage unit, in a manner associated with the user, identification information acquisition processing of acquiring the URL recorded in the storage unit in response to a callup instruction by the user, second output control processing of outputting a screen including a hyperlink of the URL that is acquired, as a separate screen from the virtual space screen, resource acquisition processing of accepting selection of the hyperlink by the user, and acquiring the resource corresponding to the hyperlink, and third output control processing of outputting a screen, using the resource that is acquired, to the display unit.

In an exemplary implementation of the present disclosure, a server for solving the above problem includes a distribution management unit that transmits drawing data, for outputting a virtual space screen including an image of a virtual space and a URL registration display for registering a URL associated with a link target in the virtual space to a display unit, to a user device used by a user, a viewing history information reception unit that, after the URL acquired by the user selecting the URL registration display is recorded in a storage unit, receives viewing history information indicating that the user viewed a screen that uses a resource identified by the URL, and an achievement recording unit that, on the basis of the viewing history information, calculates a view count of the resource and records the view count in an achievement information storage unit as achievement information, for each of the link targets.

In an exemplary implementation of the present disclosure, an information processing method for solving the above problem is an information processing method of a server, connected to a user device, executing distribution management processing of transmitting drawing data, for outputting a virtual space screen including an image of a virtual space and a URL registration display for registering a URL associated with a link target in the virtual space to a display unit, to the user device used by a user, viewing history information reception processing of, after the URL acquired by the user selecting the URL registration display being recorded in a storage unit, receiving viewing history information indicating that the user viewed a screen that uses a resource identified by the URL, and achievement recording processing of, on the basis of the viewing history information, calculating a view count of the resource and recording the view count in an achievement information storage unit as achievement information, for each of the link targets.

In an exemplary implementation of the present disclosure, an information processing system for solving the above problem includes a first output control unit that outputs a virtual space screen, including an image of a virtual space and a URL registration display for registering a URL of a resource associated with a link target in the virtual space, to a display unit, an identification information registration unit that, in a case of accepting selection of the URL registration display by a user, records the URL of the resource associated with the link target in a storage unit, in a manner associated with the user, an identification information acquisition unit that acquires the URL recorded in the storage unit in response to a callup instruction by the user, a second output control unit that displays a screen including a hyperlink of the URL acquired by the identification information acquisition unit as a separate screen from the virtual space screen, a resource acquisition unit that accepts selection of the hyperlink by the user, and acquires the resource corresponding to the hyperlink, and a third output control unit that displays a screen, using the resource that is acquired, on the display unit.

First Embodiment

A first embodiment of a program, an information processing method, a server, an information processing method of the server, and an information processing system, will be described below.

Information Processing System

An information processing system 11 will be described with reference to FIG. 1. The information processing system 11 includes a management server 12 and user devices 20 used by users 10. The management server 12 and the user devices 20 exchange data over a network such as the Internet or the like. In the present embodiment, the information processing system 11 is a system that enables distribution of moving images. The moving images display images of virtual space. The information processing system 11 provides images of virtual space as images of space in which positions of the users 10 in the virtual space (hereinafter "virtual position") change in accordance with instructions of the users 10. The space through which the users can move their positions is also referred to as a "world" or a "field".

The management server 12 is made up of one or a plurality of devices. That is to say, the management server 12 may be a server group. The management server 12 connects to the user devices 20 via the network. The user devices 20 are devices in which an application for distributing and watching moving images is installed (implemented), or devices used by users 10 who have performed user registration with a moving image providing service for distributing and watching moving images. The management server 12 serves to relay data relating to distribution of moving images.

A user 10 that distributes moving images using a user device 20 will be referred to as a "distributing user 10A", and a user that watches the distributed moving image will be referred to as a "watching user 10B". A user 10 can be both a distributing user 10A and a watching user 10B. That is to say, a user 10 is a distributing user 10A in a case of distributing moving images, and is a watching user 10B in a case of watching moving images. Also, a user device 20 used by the distributing user 10A will be referred to as a "distributing user device 20A", and a user device 20 used by the watching user 10B will be referred to as a "watching user device 20B". In the present embodiment, in a case in which description is made without distinguishing between the distributing user 10A and the watching user 10B, the term used will be simply "user 10". Also, in a case in which description is made without distinguishing between the distributing user device 20A and the watching user device 20B, the term used will be simply "user device 20".

The management server 12 stores asset data for one or a plurality of virtual spaces. A plurality of static objects are set at predetermined positions in a virtual space. The virtual space may also contain moving objects.

The management server 12 receives distribution requests for moving images from the user devices 20. At this time, the user 10 can specify the virtual space. The management server 12 generates a room (distribution frame) in the virtual space specified by the user 10. The management server 12 also transmits asset data of the virtual space to the user device 20.

The distribution frame of moving images currently being distributed is displayed on a list screen displayed on each user device 20. The watching user 10B can start watching a moving image by selecting, from the list screen, the distribution frame of the moving image that he/she desires to view.

Also, the distributing user device 20A can acquire a Uniform Resource Locator (URL) associated with the virtual space while distributing a moving image. After distribution of the moving image ends, the distributing user device 20A accesses a Web server 13 storing a resource (information resource) identified by the URL that is acquired, and thereby displays a screen using the resource. An example of a screen using the resource is a Web page. Note that a URL is identification information indicating a position of the resource on the network, and can also be said to be a Uniform Resource Identifier (URI). A Uniform Resource Name (URN) may also be used instead of a URL.

Hardware Configuration

Figure 2:
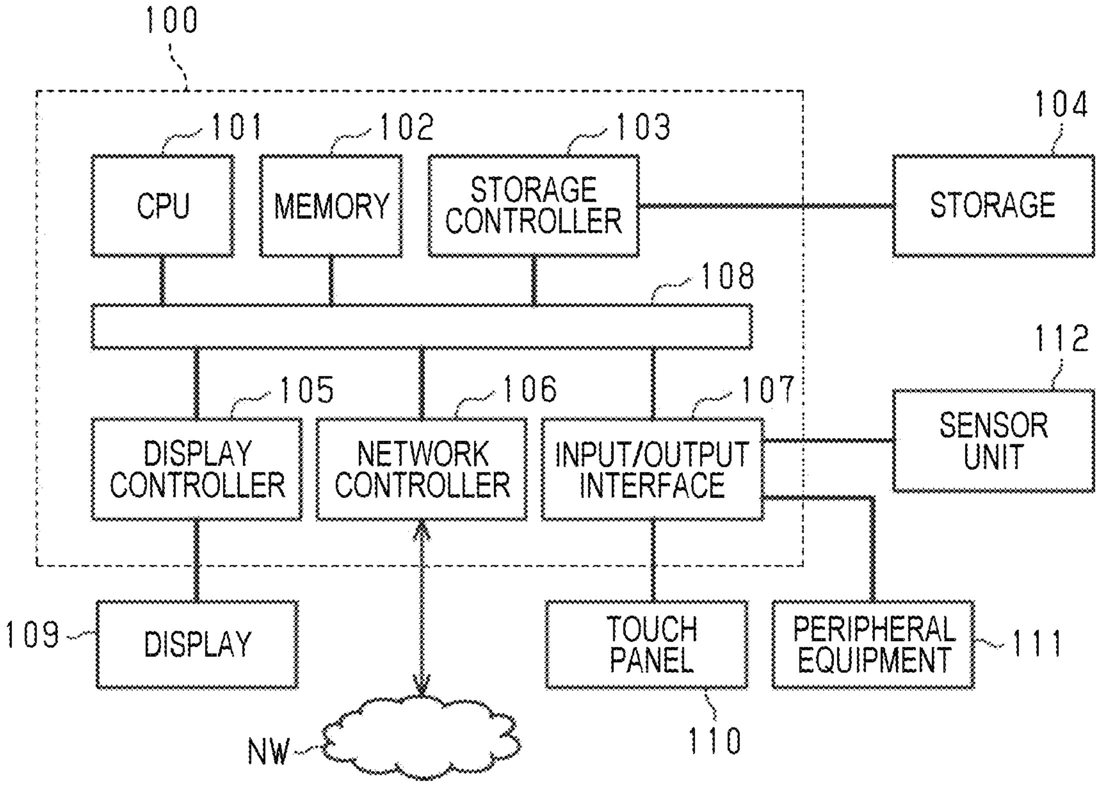
FIG. 2 is a diagram illustrating a hardware configuration of a device, such as a user device or the like according to the embodiment.

A hardware configuration of the user device 20 will be described with reference to FIG. 2. The user device 20 is a smartphone (multifunctional telephone terminal), a tablet terminal, a personal computer, a console gaming device, a wearable computer, or an information processing device other than these devices that is capable of playback of moving images. It is sufficient for the wearable computer to include a screen on which the user can watch moving images. Examples include a head-mounted display that is mounted to the head of the user, or an eyeglasses-type wearable terminal or the like. The user device 20 is made up of a device that acts singularly, or of a plurality of devices that are connected so as to be capable of exchanging various types of data with each other. An example of the latter user device 20 is a system that performs outside-in tracking, for example.

The user device 20 includes a processing circuit 100, storage 104, a sensor unit 112, a display unit 109, a touch panel 110, and peripheral equipment 111. The user device 20 exemplified in FIG. 2 includes the sensor unit 112 that detects actions of the distributing user 10A. Note that the sensor unit 112 may be a device that is separate from the user device 20 and that is communicably connected to the user device 20.

The processing circuit 100 includes a central processing unit (CPU) 101 that is a processor executing one or more of control processes disclosed in the present specification, and memory 102. Processing data and commands may be stored in the memory 102. Such processing data and commands may also be stored in the storage 104 that is a storage medium disk such as a hard disk drive (HDD), a portable storage medium, or the like. Alternatively, storage thereof may be in a storage medium provided separately from the processing circuit 100. The storage 104 is connected to the CPU 101 via a bus 108 and a storage controller 103. In the present embodiment, applications are stored in the storage 104. Applications include programs for distributing and watching moving images, and various types of data necessary for executing the programs.

The functions disclosed in the present specification can be implemented not only by the CPU 101, but also by using general-purpose processors configured or programmed to execute the disclosed functions, special-purpose processors, integrated circuits, application specific integrated circuits (ASICs), other conventional circuits, or one or more circuits capable of including combinations thereof. The processor includes transistors and other circuits therein, and accordingly is a processing circuit or a circuit. The processor may be a processor that is programmed to execute the programs stored in the memory. In the present disclosure, units such as processing circuits and so forth are hardware that executes, or is programmed to execute, cited functions. The hardware may be any hardware disclosed in the present specification or otherwise known, which is programmed or configured to execute cited functions.

Further, the processor is not limited by the form of the computer-readable medium in which the commands for the process are stored. For example, the commands may be stored in a compact disc (CD), a Digital Versatile Disc (DVD), flash memory, random-access memory (RAM), read-only memory (ROM), programmable read-only memory (PROM), erasable programmable read-only memory (EPROM), electrically erasable programmable read-only memory (EEPROM), a hard disk, or other non-transitory computer-readable media, of an information processing device with which the processing circuit 100 communicates, and may be stored in a server or a computer, for example. Also, the process may be stored in network-based storage, cloud-based storage, or other mobile-accessible storage, so as to be executable by the processing circuit 100.

The descriptions or blocks in the flowcharts disclosed in the present specification can be understood to represent modules, segments, or portions of code containing one or more executable commands to implement particular logical functions or steps in the process. Also, functions of the above descriptions or blocks can be executed at substantially the same time, in reverse order, or the like, or in a different order from the order illustrated therein or described in the specification.

Hardware elements for realizing the processing circuit 100 can be realized by various circuit elements. Further, the functions disclosed in the present specification may be realized by a circuit including one or a plurality of processing circuits.

The processing circuit 100 also includes a network controller 106 for connecting to a network NW. The network NW can be a public network such as the Internet, a private network such as a local area network (LAN) or a wide area network (WAN) or the like, or any combination thereof, and can also include a public switched telephone network (PSTN), an integrated service digital network (ISDN, registered trademark) or a sub-network. The network NW can also be wired, such as an Ethernet (registered trademark) network, a Universal Serial Bus (USB) cable, or the like, and can also be wireless such as a cellular network including 3G, 4G, and 5G wireless cellular systems. Also, a wireless network can be Wi-Fi (registered trademark), wireless LAN, Bluetooth (registered trademark), or another known wireless communication form. Further, the network controller 106 can conform to other direct communication standards such as Bluetooth (registered trademark), near-field communication (NFC), infrared, and so forth.

The processing circuit 100 further includes a display controller 105 and an input/output interface 107. These are connected to the bus 108. The display controller 105 is connected to the display unit 109. The input/output interface 107 is connected to the touch panel 110 and the peripheral equipment 111.

Description will be made regarding the sensor unit 112. The sensor unit 112 is one or a plurality of sensors that detect face motions indicating change in expressions of the user, and body motions indicating change in relative positions of the body of the user as to the sensor unit 112. Face motions include motions such as blinking, opening and closing of the mouth, and so forth. A known sensor unit may be used for the sensor unit 112. The sensor unit 112 has a sensor that measures distance to a measurement object by casting light onto the measurement object. Sensors for TrueDepth, LIDAR (an acronym for light detection and ranging, or laser imaging detection and ranging), or the like, for example, can be used. For example, a light-emitting unit projects tens of thousands of invisible dots on the face and so forth of the user by a dot projector. Reflected light of a dot pattern is detected, analysis is performed to form a depth map of the face, and an infrared image of the face and so forth is captured, thereby capturing accurate facial data. A computation processing unit of the sensor unit 112 generates various types of information on the basis of the depth map and the infrared image, and compares this information with reference data that is already registered, thereby calculating depth of each point on the face (distance between each point and an infrared camera), and positional deviation other than depth. Also, another example of the sensor unit 112 includes at least one of a time of flight (ToF) sensor that measures time of flight of light cast toward the user reflecting at a measurement object such as the face or the like of the user and returning, or phase difference thereof, a camera that shoots images of the face of the user, and an image processing unit that performs image processing of the data shot by the camera, by a ranging method other than the above-described method. The ToF sensor calculates the distance to the measurement object on the basis of the time of flight or the phase difference.

The sensor unit 112 outputs face motions and body motions to the processing circuit 100 as tracking data. Note that tracking data is included in motion data. Motion data refers to data in general to cause actions of an avatar object. For example, motion data includes emote data in addition to tracking data. Emote data is data for causing an avatar object to perform predetermined actions that are registered in advance, such as "clap" or the like. Such actions of avatar objects that are registered in advance will be referred to as "emotes" hereinafter.

Also, the sensor unit 112 may have functions of tracking not only the face of the user but also the hands as well (hand tracking). The sensor unit 112 may also include sensors to detect positions and orientations of human body parts other than the hands. The sensor unit 112 may further include a sensor that detects speed or acceleration, a sensor that detects direction or orientation (gyro sensor or the like), and so forth. The sensor unit 112 may have spatial mapping functions for recognizing physical objects in the real space where the user is present, on the basis of detection results of the various types of sensors, and mapping the recognized physical objects in a spatial map.

The peripheral equipment 111 includes a microphone and a speaker. The peripheral equipment 111 may also be operating buttons provided in a housing or the like of the user device 20, a keyboard, a mouse, a controller to be operated by the hands of the user, and so forth. The controller may have built therein various types of known sensors, such as an inertial measurement unit (IMU) or the like that includes acceleration sensors, gyroscopes, and so forth. Another example of the peripheral equipment 111 may be a tracking device that identifies movement of the hands, movement of the eyes, movement of the head, direction of the line of view, and so forth, of the user. In this form, user instructions can be determined on the basis of the movement of the hands of the user, for example, in order to execute various types of operations such as starting or ending distribution of a moving image, evaluating messages and moving images, displaying predetermined objects, and so forth. Note that in a case in which the user device 20 includes an input device such as a mouse, controller, or the like, as the peripheral equipment 111, the touch panel 110 may be omitted. Also, in a case in which the user device 20 includes the touch panel 110, the input devices such as the mouse, controller, and so forth may be omitted.

The application for moving images that is installed in the storage 104 will be described. The application includes a native portion that is implemented in the user device 20. The native portion runs on an operating system (OS) of the user device 20, and is capable of accessing devices (physical resources) of the user device 20, such as the storage 104, camera, and so forth thereof. The native portion displays moving images on the display unit 109 on the basis of drawing data received from the management server 12.

In one form, the application includes an in-app browser. The in-app browser is a component for realizing browser functions such as Web View or the like, included in the application. WebView is embedded in the application. WebView is an application programming interface (API) such as, for example, SFSafariView, WKWebView, and so forth. The in-app browser includes an analyzing unit and a display control unit. The in-app browser acquires resources. Resources are data such as Hyper Text Markup Language (HTML) files and so forth that are necessary for the in-app browser to display screens on the display unit 109, and are files described in markup languages such as HTML and so forth, files described in JavaScript (registered trademark) and so forth, Cascading Style Sheets (CSS) files, external files described in JavaScript (registered trademark), and so forth.

The analyzing unit interprets HTML, CSS, and so forth, in the same way as a standalone Web browser. The display control unit displays acquired resources on a screen, executes JavaScript (registered trademark), and so on. Resources may include audio data.

As another form, the application may activate a Web browser installed in the user device 20 separately from the application, in a case of accepting a predetermined operation from the user. In the present embodiment, the application will be described as having an in-app browser.

The management server 12 has the processing circuit 100 and the storage 104 of the same configuration as those of the user device 20. The touch panel 110, the peripheral equipment 111, the sensor unit 112, the display unit 109, and so forth, can be omitted from the management server 12.

User Device

Figure 3:
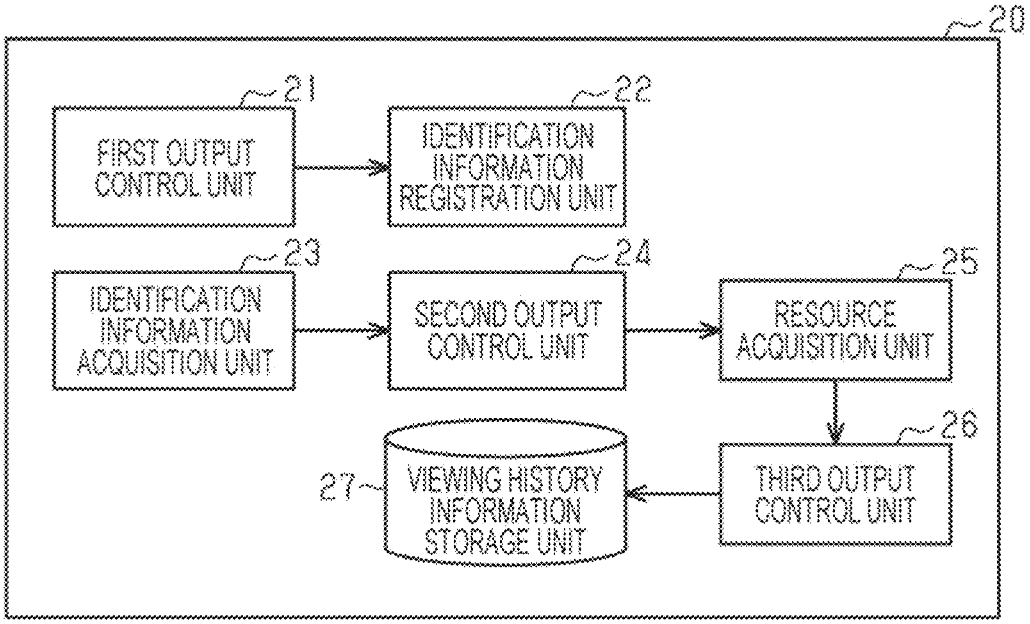
FIG. 3 is a block diagram schematically illustrating functions of the user device according to the embodiment.

Functions of the user device 20 will be described with reference to FIG. 3.

A first output control unit 21 outputs a virtual space screen that includes images of virtual space and a URL registration display for registering URLs of resources associated with link targets of the virtual space to the display unit 109. In a case of the distributing user 10A intending to view a resource associated with a link target such as contents or the like after distribution, the distributing user 10A can register the URL by selecting a URL registration display 66 that is displayed. The distributing user 10A can then output the resource identified by the URL to the display unit 109 by performing operations of calling up the URL.

The first output control unit 21 outputs an avatar object corresponding to the user 10 into the virtual space. In a case in which activities of the avatar object satisfy a display condition, the first output control unit 21 displays the URL registration display on the display unit 109. Also, the first output control unit 21 outputs the virtual space screen on the display unit 109 used by the distributing user 10A, and also transmits drawing data for outputting moving images to the watching user device 20B that the watching user 10B uses.

Upon accepting selection of the URL registration display by the user 10, an identification information registration unit 22 records the URL of the resource associated with the link target in the storage unit, in a manner associated with the user. In the present embodiment, the storage unit is a registration information storage unit 35 of the management server 12. Also, in the present embodiment, only the distributing user device 20A is capable of accepting selection of the URL registration display. In a case of accepting this selection, the identification information registration unit 22 of the distributing user device 20A records the URL in the storage unit, in a manner associated with the distributing user 10A.

An identification information acquisition unit 23 acquires the URL that is recorded, in response to a callup instruction by the user 10. The identification information acquisition unit 23 also acquires the URL, in response to a callup instruction by the distributing user 10A.

A second output control unit 24 displays a screen including a hyperlink for the URL acquired by the identification information acquisition unit 23 as a separate screen from the virtual space screen.

A resource acquisition unit 25 accepts selection of the hyperlink by the user 10, and acquires the resource corresponding to the hyperlink.

A third output control unit 26 outputs a screen using the resource that is acquired to the display unit 109. The third output control unit 26 also records viewing history of the resource in a viewing history information storage unit 27.

Management Server

Figure 4:
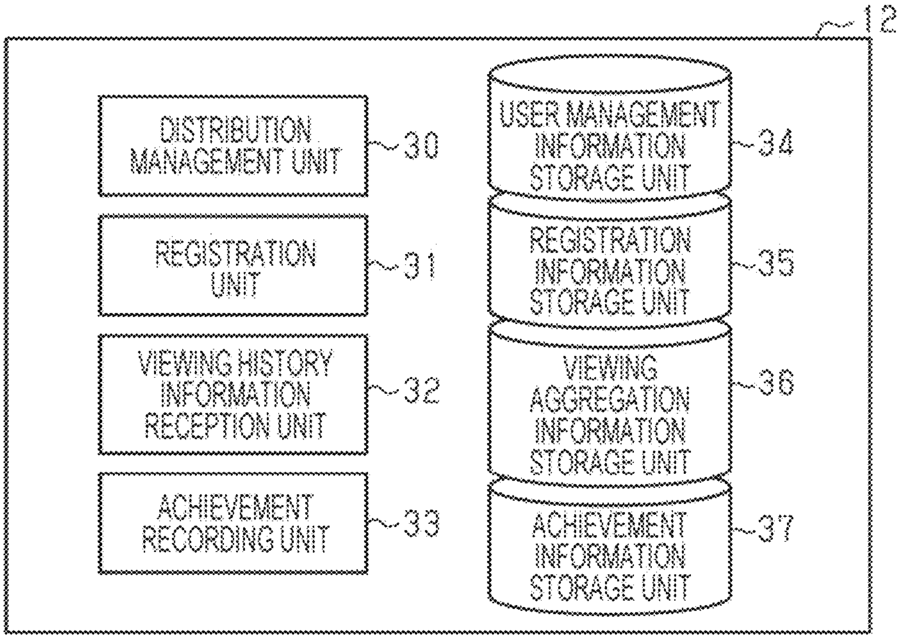
FIG. 4 is a block diagram schematically illustrating functions of a management server according to the embodiment.

A configuration of the management server 12 will be described with reference to FIG. 4.

The management server 12 includes a distribution management unit 30, a registration unit 31, a viewing history information reception unit 32, and an achievement recording unit 33. The management server 12 also includes a user management information storage unit 34, the registration information storage unit 35, a viewing aggregation information storage unit 36, and an achievement information storage unit 37.

The distribution management unit 30 transmits images of virtual space, and drawing data for outputting, to the display unit 109, virtual space screens including the URL registration display for registering URLs of resources associated with link targets of the virtual space, to the user device 20. The distribution management unit 30 transmits asset data for drawing objects in the virtual space to the user device 20. The distribution management unit 30 also receives data for drawing avatar objects including motion data from the distributing user device 20A, and also transmits the received data to the user device 20.

In a case in which a URL registration display is selected by the user 10, the registration unit 31 receives information indicating that the URL registration display has been selected from the user device 20 that the user 10 uses. Also, the registration unit 31 records the URL associated with the URL registration display in the storage unit in a manner associated with the user, and also transmits the URL recorded in the storage unit to the user device, in response to the callup instruction received from the user device.

The viewing history information reception unit 32 receives viewing history information by the user selecting the URL registration display. The viewing history information indicates history of the user viewing the resource identified by the URL recorded in the registration information storage unit 35. The viewing history information reception unit 32 also receives selection information indicating that the user has selected the URL registration display.

The achievement recording unit 33 calculates, for each link target, a view count of the resource, on the basis of the viewing history information, and records this in the achievement information storage unit as achievement information.

Configuration of Data

Each kind of information recorded in the management server 12 will be described with reference to FIGS. 5 to 8.

Figure 5:
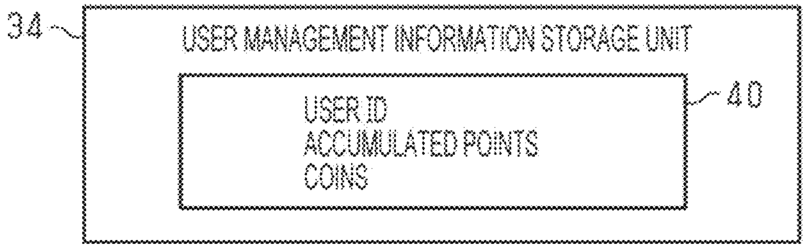
FIG. 5 is a diagram schematically illustrating user management information according to the embodiment.

FIG. 5 illustrates an example of user management information 40 recorded in the user management information storage unit 34. The user management information 40 is recorded for each user. The user management information 40 includes a user ID (identifier) that is identification information of the user, accumulated points, and coins. The accumulated points are points that are imparted through activities in an application or a platform providing the application, such as distributing or watching moving images, and so forth, and accumulated, for each user. The accumulated points can be used as a counter value for drawings (loot box) that can be executed in the application or the platform providing the application, and as a counter value for gift objects and items. Gift objects are objects that watching users provided to distributing users and so forth. Items include those worn by avatar objects and those used in games provided by the platform. Also, accumulated points may be exchangeable with currency used in the real world. Coins differ from accumulated points with regard to the point that coins can be purchased by users. Coins may be imparted through activities in the application. Also, coins may be used as a counter value for drawings, a counter value for gift objects, and so forth, in the same way as with accumulated points.

Figure 6:
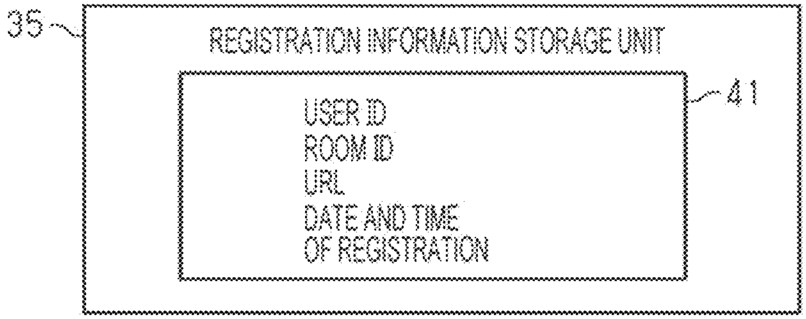
FIG. 6 is a diagram schematically illustrating registration information according to the embodiment.

FIG. 6 illustrates an example of registration information 41 recorded in the registration information storage unit 35. The registration information 41 is generated or updated when a URL registration display displayed in a moving image is selected. The registration information 41 includes the user ID, a room ID (identifier), a URL, and date and time of registration. The registration information 41 is recorded for each user. The room ID is an identifier of the moving image that was being distributed at the time of the URL registration display being selected. The URL is the URL associated with the URL registration display that is selected. The date and time of registration indicates the date and time of the URL registration display being selected.

Figure 7:
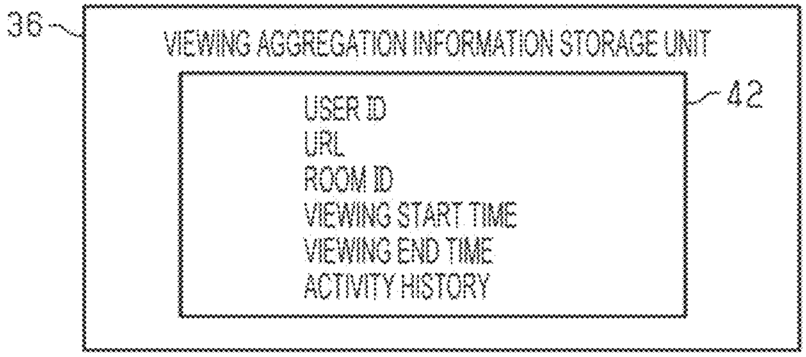
FIG. 7 is a diagram schematically illustrating viewing aggregation information according to the embodiment.

FIG. 7 illustrates an example of viewing aggregation information 42 recorded in the viewing aggregation information storage unit 36. In the present embodiment, the viewing aggregation information 42 is updated on the basis of the viewing history information transmitted from the user device 20.

The viewing aggregation information 42 includes the user ID, URL, room ID, viewing start time, viewing end time, and activity history. The user ID, the URL, and the room ID are the same as the user ID, the URL, and the room ID in the registration information 41. The viewing start time is the time at which the user device 20 connected to the Web server 13 or the user device 20 displayed the resource. The viewing end time is the time at which the user device 20 terminated the connection with the Web server 13 or the user device 20 ended display of the resource. The activity history indicates activities executed by the user 10 with respect to the resource that was displayed. An example of activity history is requesting reference materials or the like at the resource destination, making purchases at the resource destination, and so forth.

Figure 8:
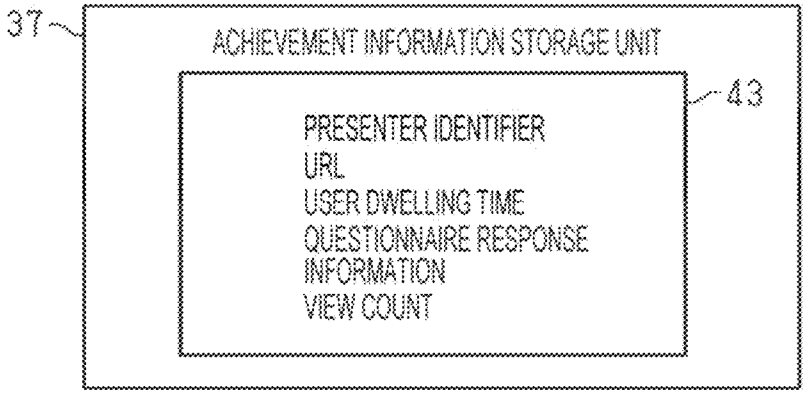
FIG. 8 is a diagram schematically illustrating achievement information according to the embodiment.

FIG. 8 illustrates an example of achievement information 43 recorded in the achievement information storage unit 37. The achievement information 43 is recorded for each presenter. A presenter is a presenter that presents a virtual space, a presenter that presents exhibits or merchandise or the like in a dedicated region within the virtual space, and so forth. Presenters presenting exhibits can advertise the exhibits to users 10. Also, presenters that present merchandise can obtain counter value for the merchandise from users 10.

The achievement information 43 includes a presenter identifier, URL, user dwelling time, questionnaire response information, and view count. The presenter identifier is an identifier allocated to the presenter. The user dwelling time indicates the amount of time of each user 10 viewing a resource, or statistical information of the viewing time of each user. This amount of time can be calculated from the viewing start time and the viewing end time in the viewing aggregation information 42. The user dwelling time may be the dwelling time of users viewing the resource individually recorded. Alternatively, the user dwelling time may be average dwelling time of users. The questionnaire response information indicates contents of questionnaires that users 10 responded to in the virtual space. The view count is a count that is obtained by aggregation of the viewing history information, and is the total count of times of the resource being displayed by using the URL that is registered. Also, achievement information may include a click count (selection count), which is the count of times obtained by aggregating information that indicates users selecting the URL registration display. This information is received from the user devices 20. Also, the achievement information 43 may include a conversion count obtained by totaling the count of times that users 10 perform an activity that is decided in advance.

Moving Image Distribution and Watching Schemes

Next, schemes for distributing or watching moving images will be described. One of a client rendering scheme, a browser rendering scheme, a video distribution scheme, and a server distribution scheme, can be used as a scheme for distributing and watching moving images. In the present embodiment, the client rendering scheme is used.

The client rendering scheme is a scheme in which each user device 20 executes a program, thereby rendering objects. The user device 20 stores three-dimensional model data and so forth of an avatar object and physical body objects other than the avatar object. The three-dimensional model data of the avatar object includes drawing data for a main body part making up the main body of the avatar object, and mounted parts that are mountable to the avatar object. Data of the main body part includes polygon data, skeletal (bone) data for expressing actions of the avatar object, texture data, and so forth. The mounted parts include texture data and so forth. The distributing user 10A can set the mounted parts of the avatar object corresponding to him/herself to be parts according to his/her preferences. The model data of physical body objects other than the avatar object includes polygon data, texture data, and so forth.

The first output control unit 21 performs drawing using motion data, and drawing data including identification information (part ID) indicating the parts of the objects. The first output control unit 21 transmits the motion data, and the drawing data including part IDs of each of the parts, to the management server 12. The management server 12 transmits the drawing data to the watching user device 20B. The watching user device 20B receives the data from the management server 12. The user device 20 then uses this data to draw the avatar object of the distributing user 10A and the other objects.

Also, the first output control unit 21 transmits audio data based on audio collected by the microphone to the management server 12. The management server 12 transmits the audio data to the watching user device 20B. The motion data, coordinate data, and audio data are imparted with timestamps.

The first output control unit 21 of the watching user device 20B receives the drawing data and the audio data for displaying the moving image from the management server 12. The first output control unit 21 then uses the drawing data to draw the image including the avatar object that corresponds to the distributing user 10A.

The first output control units 21 of the distributing user 10A and the watching user 10B also receive data of messages and so forth, posted by other users, from the management server 12. The first output control unit 21 outputs moving image data, in which an image of the avatar object and the other objects are rendered, and the posted messages, notifications, and so forth, are composited, to the display unit 109. The first output control unit 21 also outputs the audio data from the speaker, synchronized with the moving image data on the basis of the timestamps.

Note that the distributing user device 20A and the watching user device 20B may display moving images by different schemes from each other. For example, the distributing user device 20A may display moving images by the client rendering scheme, while the watching user device 20B displays moving images by the browser rendering scheme. An arrangement may also be made in which the user can select the method for displaying moving images. For example, some devices of the watching user devices 20B may display moving images by the client rendering scheme, while other devices display moving images by the browser rendering scheme. In the present embodiment, each user device 20 generates moving images according to the client rendering scheme.

Configuration of Virtual Space

A configuration of virtual space 50 will be described with reference to FIGS. 9 to 14.

Figure 9:
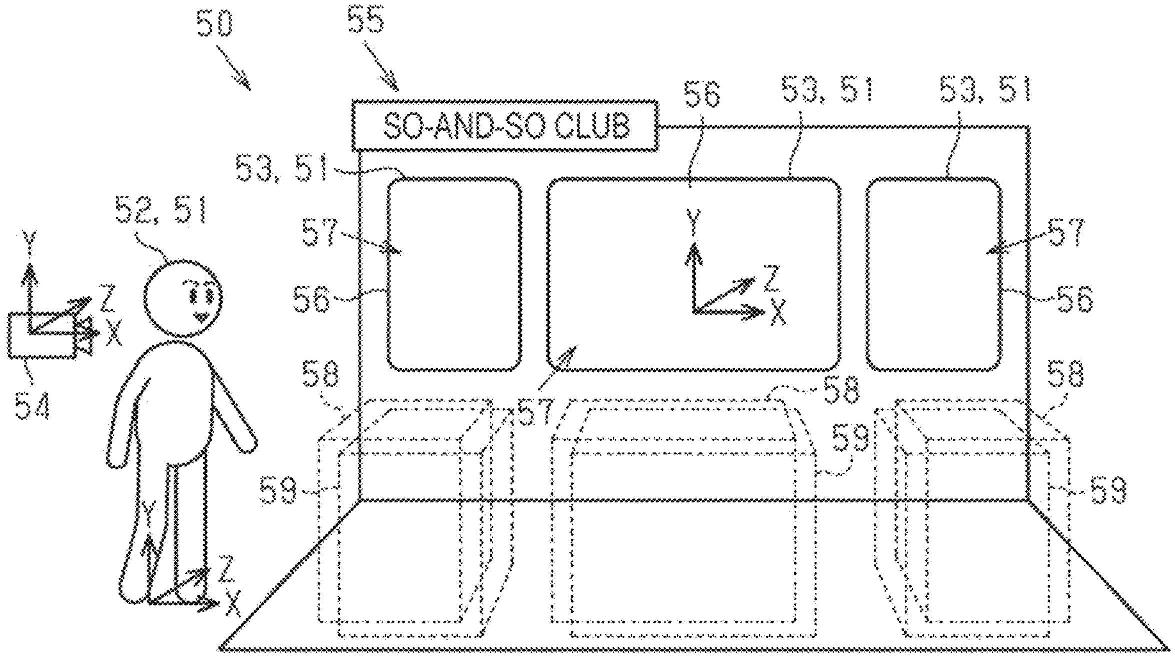
FIG. 9 is a diagram schematically illustrating virtual space according to the embodiment.

As illustrated in FIG. 9, the virtual space 50 includes a plurality of objects 51. The objects 51 situated in the virtual space 50 include an avatar object 52, and physical body objects 53 that are other objects.

A world coordinate system (X, Y, Z) that indicates positions in the virtual space is set in the virtual space 50. The world coordinate system is also referred to as a global coordinate system. Positions of the avatar object 52 and the physical body objects 53 can be identified by coordinates of the world coordinate system. An object coordinate system (x, y, z) is set for each of the avatar object 52 and the physical body objects 53. The orientation, actions, and so forth of the avatar object 52 and the physical body objects 53 can be identified by coordinates of the object coordinate system. These coordinates include roll, pitch, and yaw indicating rotational coordinates as to coordinate axes.

A virtual camera 54 corresponding to each distributing user 10A is situated in the virtual space 50. A camera coordinate system is set for the virtual camera 54. Orientation of the camera, and actions thereof such as pan, tilt, and so forth, can be identified by the camera coordinate system. The virtual camera 54 is associated with the avatar object 52. The first output control unit 21 causes the virtual camera 54 to track the avatar object 52 in accordance with movement thereof. For example, the first output control unit 21 acquires a movement direction that the distributing user 10A instructs, converts the movement direction into a direction in the word coordinate system, and moves the avatar object 52. The first output control unit 21 generates a two-dimensional image on the basis of the coordinates of objects included in a range of a predetermined field of view centered on an optical axis of the virtual camera 54. The first output control unit 21 then outputs the two-dimensional image to the display unit 109. The term "rendering" as used here refers to drawing processing including acquisition of the position of the virtual camera, perspective projection, hidden surface removal based on depth information corresponding to each of the objects, and so forth. Rendering may be processing of at least one of these, and may include processing such as shading, texture mapping, and so forth.

The position of the virtual camera 54 is changeable by at least one of the distributing user 10A and the watching user 10B. For example, the distributing user 10A can select first-person perspective (avatar position) and third-person perspective, as settings regarding the position of the virtual camera 54. In first-person perspective, the first output control unit 21 performs rendering in a state in which the position of the eyes of the avatar and the position of the virtual camera 54 are matched, or approximately matched. In this case, the line of view of the avatar object 52 and the optical axis of the virtual camera 54 are approximately matched. Thus, an image is displayed on the display unit 109 as if the avatar object 52 was looking at the virtual space 50. In third-person perspective, the first output control unit 21 performs rendering with the virtual camera 54 set at a position around the avatar object 52, such that the avatar object 52 is at a predetermined position, like as at the middle of the screen, or the like. Setting the virtual camera 54 to the third-person perspective enables the image of the avatar object 52 to be displayed on the screen. The first output control unit 21 may be capable of changing the position of the virtual camera 54 in third-person perspective. Alternatively, multi-view camera, in which one (or a plurality) is selected from virtual cameras 54 arrayed at three or more positions, may be used to generate images.

The virtual space 50 exemplified in FIG. 9 is a space in which a plurality of presenters present contents that are link targets in exhibition booths 55 that are allocated to the presenters. The virtual space 50 has a plurality of exhibition booths 55. Each exhibition booth 55 contains one or a plurality of content display objects 56.

Content display objects 56 are, for example, objects made up of a two-dimensional display surface with no thickness, or three-dimensional objects that have a display surface. Content display objects 56 are objects that are visually recognizable by the users 10, transparent objects that are not visually recognizable on the screen, and so forth. Contents 57 presented by presenters can be displayed on the display surfaces. The contents 57 are images such as still images in JPEG format, GIF format, PNG format, or the like, moving images based on moving image data such as MPEG4 or the like, and so forth. The first output control unit 21 projects the contents 57 specified by the presenter in advance on the content display object 56 by a technique such as texture mapping or the like.

Data for displaying a link target such as contents 57 or the like may be recorded in the management server 12. In this case, in response to a request from a user device 20 (distributing user device 20A and watching user device 20B), the management server 12 transmits data for displaying the link target to the user device 20. Alternatively, the Web server 13 may have data for displaying the link target, such as the contents 57 or the like, recorded therein. In this case, in response to a request from the user device 20 (distributing user device 20A and watching user device 20B), the Web server 13 transmits data for displaying the link target to the user device 20. Alternatively, the watching user device 20B may receive data of an image of the link target that is output by the distributing user device 20A, from the distributing user device 20A via the management server 12.

The URL registration display 66 (see FIG. 11) directly or indirectly corresponds with the contents 57. Display conditions for displaying the URL registration display 66 may differ depending on the link target. Also, the display form of the URL registration display 66 may differ depending on the link target. The display condition for displaying the URL registration display 66 corresponding to the contents 57 exemplified in FIG. 9 is that the position of the avatar object 52 is within a determination region associated with the contents 57.

For example, the virtual space 50 includes first determination regions 58 and second determination regions 59 corresponding to each of the contents 57. The first determination region 58 is a region for performing determination regarding display of the URL registration display 66. A script for displaying the URL registration display 66 is associated with the first determination region 58. The second determination region 59 is a region for performing determination regarding display of questionnaire response items. For example, the first output control unit 21 handles the first determination regions 58 and the second determination regions 59 as non-display (transparent) objects, and does not perform display thereof in the virtual space screen. The first determination regions 58 and the second determination regions 59 exemplified in FIG. 9 are cuboids. Besides being cubes, the first determination regions 58 and the second determination regions 59 may be planes that are parallel to a floor surface.

Figure 10:
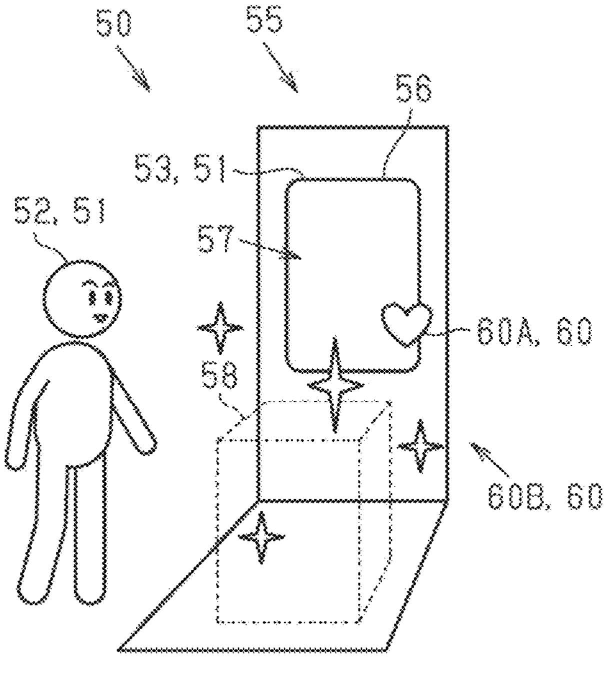
FIG. 10 is a diagram for describing an example of a display condition according to the embodiment.

As illustrated in FIG. 10, the first output control unit 21 displays a guide display 60, indicating that the URL registration display 66 can be acquired, in a manner associated with the content display object 56. The guide display 60 may be anything as long as it draws the attention of the distributing user 10A. For example, a guide display 60A is an indicator displayed nearby the content display object 56. The indicator may be anything as long as a user 10 seeing the indicator notices that the URL registration display 66 can be acquired. The indicator is a mark, icon, pictogram, or button. The indicator is, for example, a heart symbol, or the like. Also, the guide display may be a user interface (UI) element such as a "like button" or the like. Also, a guide display 60B is an effect (staged display) that is displayed nearby the content display object 56, or on or nearby the first determination region 58. The effect is displayed such that particles of light emerge and disappear, or the like. Although two guide displays 60A and 60B are displayed in FIG. 9, it is sufficient for at least one to be displayed.

Figure 11:
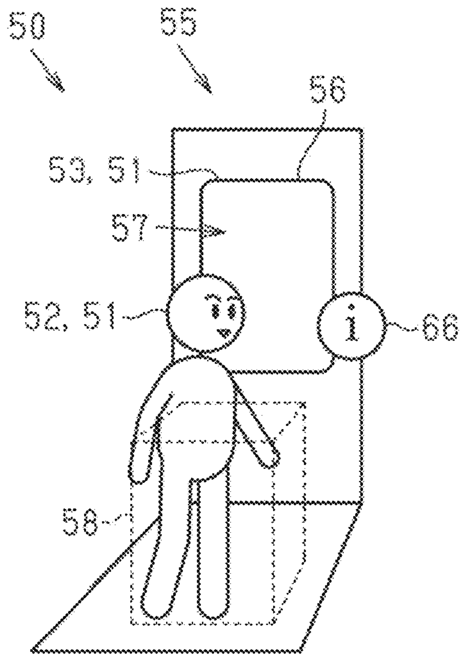
FIG. 11 is a diagram for describing a URL registration display according to the embodiment.

As illustrated in FIG. 11, the first output control unit 21 determines whether or not the position of the avatar object 52 has come into contact with the first determination region 58. In other words, determination is made regarding whether or not the position of the avatar object 52 is within the first determination region 58. In a case in which the display condition of the position of the avatar object 52 being within the first determination region 58 is satisfied, the first output control unit 21 displays the URL registration display 66 corresponding to the first determination region 58. That is to say, a first determination region 58 is set for each content 57. Also, a URL for each content 57 is associated with the URL registration display 66 corresponding to the content 57. Note that in a case in which the guide display 60 is a button, the URL registration display 66 may be displayed in a case in which the button is selected. The first output control unit 21 displays the URL registration display 66 in a manner associated with the content 57 or the content display object 56. For example, the first output control unit 21 displays the URL registration display 66 such that the object 51 closest to the URL registration display 66 is the content display object 56. Alternatively, the first output control unit 21 displays the URL registration display 66 so as to overlap on part of the content display object 56.

Displaying the URL registration display 66 only in a case in which the display condition is satisfied in this way enables the appearance of the virtual space 50 on a state in which the URL registration display 66 is not displayed to be brought closer to that of the real world, and accordingly the sense of immersion of the users 10 in the moving image can be increased. Also, in a case in which a plurality of contents 57 are displayed in the screen, displaying the URL registration display 66 corresponding to each content 57 may reduce the display area for other objects 51 and the like. Conversely, displaying the URL registration display 66 only in a case in which the display condition is satisfied enables the area occupied by the URL registration display 66 to be minimized.

The URL registration display 66 may be displayed as a UI element object having coordinates in the virtual space 50. In this case, the URL registration display 66 displayed in the screen has two-dimensional coordinates in the display region of the screen. In a case in which the display unit 109 is provided along with a touch panel, the identification information registration unit 22 judges that the URL registration display 66 has been selected when the operation position of the distributing user 10A and the position of the URL registration display 66 agree. Alternatively, the URL registration display 66 may be displayed as a graphical user interface (GUI) element that has no coordinates in the virtual space 50. This GUI element is an icon that is laid over the virtual space image, for example, and also is displayed at a certain position on the screen. Also, the design of the URL registration display 66 is not limited in particular, and may be a symbol indicating "Like" or "Good".

Also, the first output control unit 21 determines whether or not the position of the avatar object 52 has come into contact with the second determination region 59. In other words, determination is made regarding whether or not the position of the avatar object 52 is within the second determination region 59. In a case in which the condition of the position of the avatar object 52 being within the second determination region 59 is satisfied, the first output control unit 21 displays questionnaire items corresponding to the second determination region 59 on the screen. The distributing user 10A can select a questionnaire item and respond to the questionnaire.

The distributing user 10A wants to view the resource related to the content 57 when he/she has interest in the content 57. When the distributing user 10A views the resource relating to the content 57 in a Web browser outside of the application or in an in-app browser while distributing a moving image, the course of moving image distribution will be disrupted in this case. As a result, the watching user 10B watching the moving image may lose interest in that moving image. Also, depending on the distributing user 10A, after distributing a moving image of exploring the virtual space 50, the distributing user 10A may want to view resources of contents 57 that were found to be interest-provoking, all together. Also, the distributing user 10A cannot view resources in a case in which the system is such that distribution is forcibly stopped when viewing a resource in a Web browser outside of the application or in an in-app browser while distributing a moving image.

Also, a host hosting an event, and presenters that present information at the exhibition booths 55, want the distributing user 10A to go about the virtual space 50 efficiently, in order to increase the opportunity of seeing each of the exhibition booths 55. However, the distributing user 10A cannot efficiently go about the virtual space 50 of he/she views resources of contents 57 in which he/she is interested many times.

When desiring to view resources after the distribution, the distributing user 10A selects the URL registration display 66 that is displayed. In a case of accepting a selection instruction for the URL registration display 66, the identification information registration unit 22 acquires a URL associated with the content 57 corresponding to the URL registration display 66. Now, in a case in which the contents 57 displayed on the content display object 56 changes in accordance with the part of day, different URLs are associated with respective contents 57.

The identification information registration unit 22 transmits the URL that is acquired to the management server 12 along with the user ID of the distributing user 10A. For example, the URL may be included in asset data or the like. The registration unit 31 of the management server 12 records the URL that is received and the user ID in the registration information storage unit 35, in a manner associated with each other.

Alternatively, in a case in which the URL registration display 66 is selected, the identification information registration unit 22 transmits identification information of the URL registration display 66 or the content 57 to the management server 12 along with the user ID of the distributing user 10A. The registration unit 31 of the management server 12 records the URL and the user ID in the registration information storage unit 35, in a manner associated with each other, on the basis of the identification information that is received.

The link target with which the URL is associated is not limited to being a content 57, and may be a two-dimensional or three-dimensional object 51.

Figure 12:
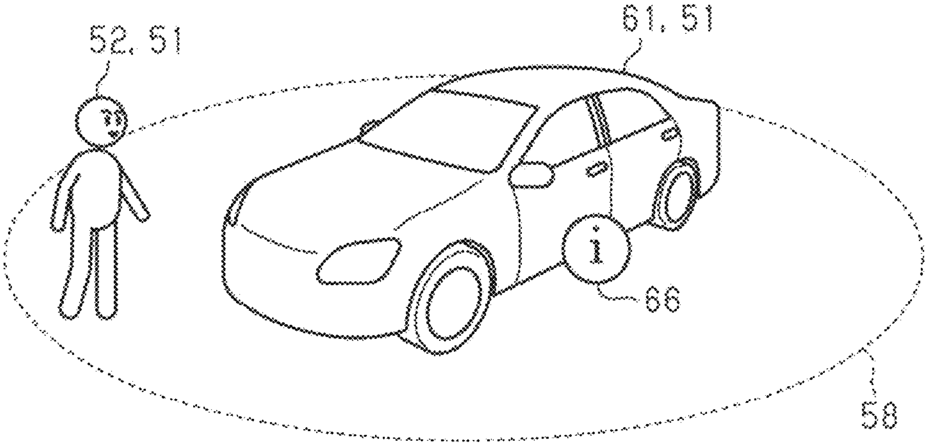
FIG. 12 is a diagram for describing an example of a display condition and the URL registration display according to the embodiment.

The object 51 that is a link target (hereinafter, "link target object 61") exemplified in FIG. 12 is a three-dimensional object of an automobile or the like. This three-dimensional object is drawn in a state of being stopped within the virtual space 50. The display condition of the URL registration display 66 corresponding to the link target object 61 exemplified in FIG. 12 is that the position of the avatar object 52 is within the first determination region 58. The first determination region 58 may be provided nearby the link target object 61. In other words, the display condition of the URL registration display 66 is that the position of the avatar object 52 and the position of the link target object 61 are in a positional relation that is set in advance. In a case of determining that the position of the avatar object 52 is within the first determination region 58, the first output control unit 21 displays the URL registration display 66 correlated with the link target object 61. The first output control unit 21 displays the URL registration display 66 near the link target object 61, or overlapping on the link target object 61, for example.

Figure 13:
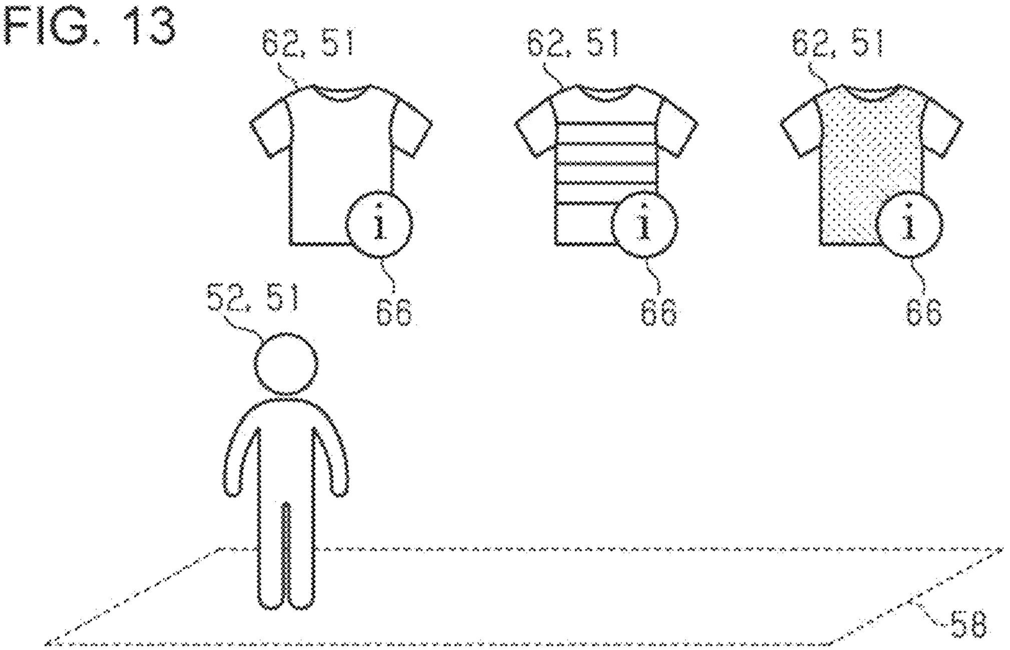
FIG. 13 is a diagram for describing an example of the display condition and the URL registration display according to the embodiment.

Link target objects 62 exemplified in FIG. 13 are items that can be mounted on the avatar object 52. The display condition of the URL registration displays 66 corresponding to the link target objects 62 is that the position of the avatar object 52 is within the first determination region 58 corresponding to a plurality of the items. As exemplified in FIG. 13, in a case of determining that the position of the avatar object 52 is within the first determination region 58, the first output control unit 21 may display the URL registration displays 66, corresponding to each of a plurality of the link target objects 62 that are associated with the first determination regions 58, during the same period. The identification information registration unit 22 acquires the URL associated with the URL registration display 66 regarding which selection operations have been performed out of the plurality of URL registration displays 66, and also performs transmission thereof to the management server 12 for registration. Although the first determination region 58 is planar in FIGS. 12 and 13, the first determination region 58 may have a three-dimensional shape. For example, in FIG. 12 the first determination region 58 may have a columnal shape. In FIG. 13, the first determination region 58 may have a cuboid shape.

Also, in a case of determining that the position of the avatar object 52 is within the second determination region 59, the first output control unit 21 displays a response display for accepting a response to a question. The first output control unit 21 accepts operations on the response display. The contents of the response are then transmitted to the management server 12, in a manner associated with the user ID of the user who responded.

Figure 14:
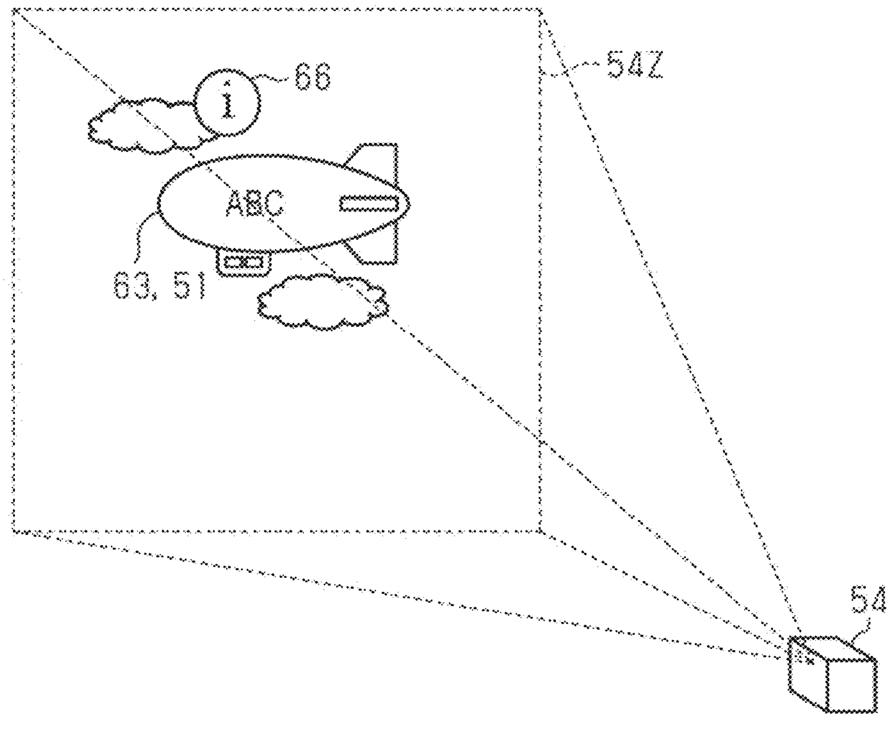
FIG. 14 is a diagram for describing an example of the display condition and the URL registration display according to the embodiment.

As exemplified in FIG. 14, a link target object 63 may be a moving object. Examples of a moving object include an airship or an automobile carrying an advertisement. The link target object 63 moves through the virtual space 50. The display condition of the URL registration display 66 corresponding to the link target object 63 is that the link target object 63 is within a field-of-view range 54Z of the virtual camera 54. The field-of-view range 54Z is a view frustum that has a frustum or pyramid shape, for example. It is sufficient for the URL registration display 66 to be displayed in a state so as to be readily operated by the user. For example, the URL registration display 66 may be displayed as a UI element object having coordinates in the virtual space, or as a UI element that does not have coordinates in the virtual space 50.

Operations

Figure 15:
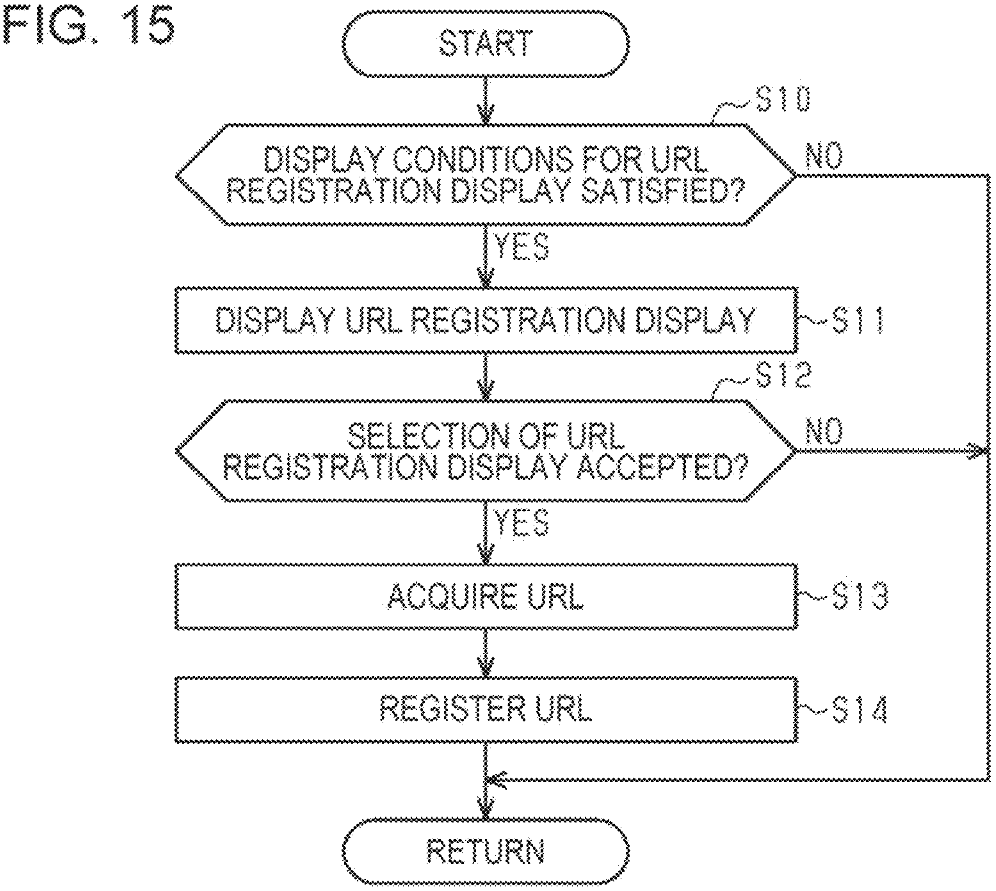
FIG. 15 is a flowchart showing processing procedures for the user device according to the embodiment.
Figure 16:
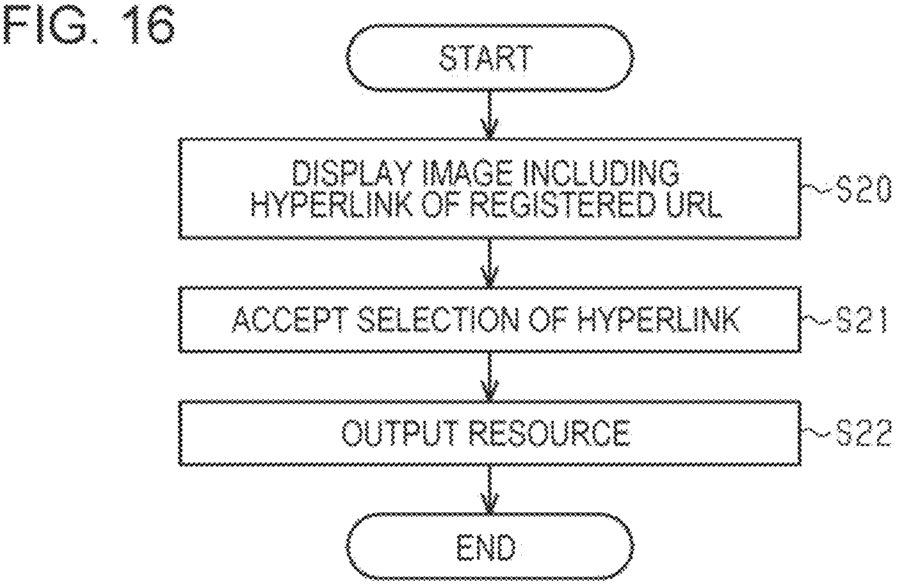
FIG. 16 is a flowchart showing processing procedures for the user device according to the embodiment.

Processing executed by the user device 20 will be described with reference to FIGS. 15 and 16.

URL registration displays 66 are displayed by at least one of the distributing user device 20A and the watching user device 20B. Also, at least one of the distributing user device 20A and the watching user device 20B can register the URLs of link targets. Further, at least one of the distributing user device 20A and the watching user device 20B can see screens including hyperlinks of the URLs. Here, only the distributing user device 20A can display URL registration displays 66, register URLs, and visually recognize screens including hyperlinks.

Also, in the present embodiment, a form in which the avatar object 52 corresponding to the distributing user 10A is displayed in the moving image, while the avatar object 52 corresponding to the watching user 10B is not displayed.

The first output control unit 21 receives asset data for the virtual space 50 from the management server 12. The asset data includes a URL associated with a link target of the virtual space 50.

The first output control unit 21 moves the avatar object 52 corresponding to the distributing user 10A through the virtual space 50, on the basis of instructions from the distributing user 10A.

Processing of the distributing user device 20A acquiring the URL will be described with reference to FIG. 15. This processing is started by the distributing user 10A starting moving image distribution in the virtual space 50. Also, this processing is ended by the moving image distribution in the virtual space 50 ending.

The first output control unit 21 determines with respect to a link target situated nearby the avatar object 52, whether or not the display condition of the URL registration display 66 corresponding to the link target is satisfied (step S10). Specifically, whether or not the display condition is satisfied regarding the link target included in the field-of-view range 54Z of the virtual camera 54 may be judged. Alternatively, whether or not the display condition is satisfied regarding a link target within a predetermined range centered on the position of the avatar object 52 may be determined. As described above, the display conditions of the URL registration display 66 may differ in accordance with the link target.

When determining that the display condition is not satisfied (NO in step S10), the first output control unit 21 repeats step S10 in conjunction with movement of the avatar object 52.

Upon determining that the display condition is satisfied (YES in step S10), the first output control unit 21 displays the URL registration display 66 (step S11). The first output control unit 21 judges whether or not selection of the URL registration display 66 has been accepted (step S12).

Upon judging that selection of the URL registration display 66 has not been accepted (NO in step S12), the first output control unit 21 returns to step S10. When the display conditions are no longer satisfied, without selection of the URL registration display 66 being accepted, the first output control unit 21 deletes the URL registration display 66.

Upon the first output control unit 21 judging that selection of the URL registration display 66 has been accepted (YES in step S12), the identification information acquisition unit 23 acquires a URL associated with the link target corresponding to the URL registration display 66 (step S13).

The identification information registration unit 22 registers the URL by transmitting the URL that is acquired to the management server 12 along with the user ID (step S14). The registration unit 31 of the management server 12 records the URL that is received in the registration information storage unit 35, in a manner associated with the user ID.

Thus, the distributing user 10A continues to acquire URLs at exhibition booths 55 that interest him/herself. One or a plurality of URLs are accumulated in the registration information storage unit 35, in a manner associated with the user ID of the distributing user 10A.

Processing for the distributing user 10A to view the resources based on the URLs that are acquired, at an optional timing after ending of distribution or the like, will be described with reference to FIG. 16.

In the present embodiment, the screen including hyperlinks is a message display screen with respect to a management account. The management account is an official account of the application, or an official account of an event. The message display screen is a screen that displays a direct email transmitted with the distributing user 10A alone as the recipient.

Upon accepting a callup instruction by the distributing user 10A, the identification information acquisition unit 23 transmits the user ID and an acquisition request for a URL to the management server 12. The registration unit 31 of the management server 12 reads out the URL with which the user ID that is received is associated, from the registration information storage unit 35. The registration unit 31 then transmits the URL that is read out to the distributing user device 20A.

The second output control unit 24 displays the screen including the hyperlink of the URL that is registered, on the basis of the URL that is received (step S20). Here, this screen is the message display screen. The resource acquisition unit 25 accepts selection of the hyperlink from the message display screen by the user (step S21). The third output control unit 26 then activates the in-app browser or external browser, and acquires the resource identified by the URL. The third output control unit 26 also outputs a screen using the resource that is acquired to the display unit 109 (step S22).

When the third output control unit 26 outputs the screen using the resource, the analyzing unit of the browser records viewing history information of the resource in local storage. Also, the analyzing unit of the browser transmits the viewing history information recorded in the local storage to the management server 12 along with the user ID.

The viewing history information reception unit 32 of the management server 12 generates or updates the viewing aggregation information 42 using the viewing history information. The achievement recording unit 33 aggregates the viewing aggregation information 42 corresponding to a plurality of the users 10 and updates the achievement information 43.

Updating of the achievement information by the achievement recording unit 33 will be described. The achievement recording unit 33 calculates the view count of the resource for each link target. For example, in a case in which viewing history of "resource A" corresponding to "link target object A" is included in the viewing aggregation information 42, the achievement recording unit 33 increments the view count of the "link target object A" (page view count). Also, in a case in which activity history such as purchasing history, reference material requesting history, or the like at "resource A" is included in the viewing aggregation information 42, this activity history is recorded in the activity history for "link target object A".

Display of Screens

Screens that the distributing user device 20A displays will be described with reference to FIGS. 17 to 20. Note that FIGS. 17 to 20 illustrate screens in a case in which the position of the virtual camera 54 is third-person perspective.

Figure 17:
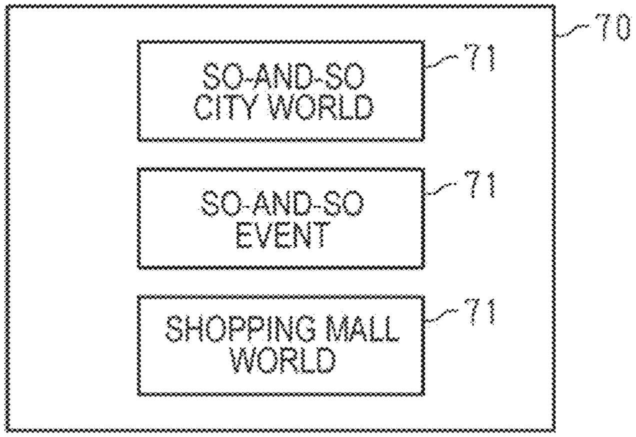
FIG. 17 is a diagram for describing a selection screen displayed on the user device according to the embodiment.

FIG. 17 is a world selection screen 70 displayed by the distributing user device 20A. The world selection screen 70 includes selection portions 71 (banners) corresponding to a plurality of virtual spaces 50 (worlds). When one of the selection portions 71 is selected, the first output control unit 21 transmits a distribution start request to the management server 12.

Upon receiving the distribution start request, the management server 12 sets the user 10 that transmitted the distribution start request as a distributing user 10A, and also generates a room. The management server 12 also transmits asset data to the distributing user device 20A.

Figure 18:
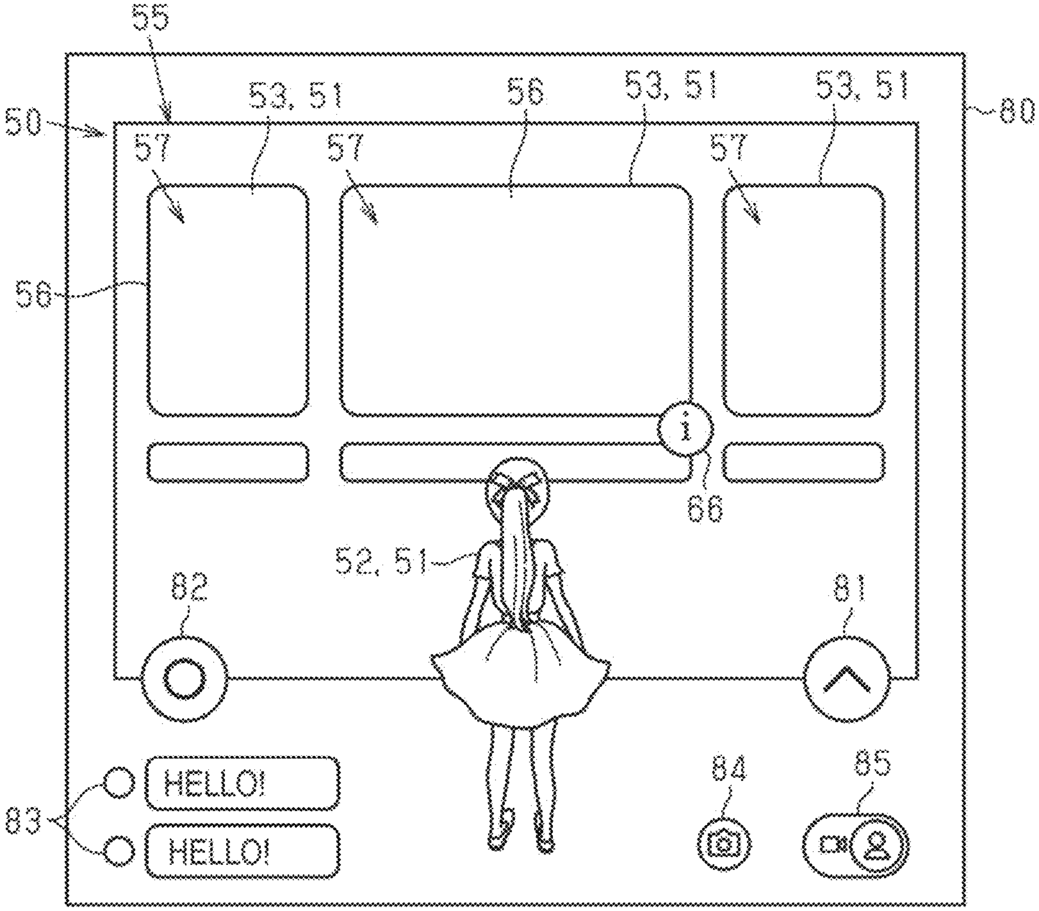
FIG. 18 is a diagram for describing a virtual space screen displayed on the user device according to the embodiment.

As illustrated in FIG. 18, the first output control unit 21 displays a virtual space screen 80 using the asset data. Specifically, the first output control unit 21 displays physical body objects 53 on the basis of the asset data.

An image of an exhibition booth 55 is displayed in the virtual space screen 80 exemplified in FIG. 18. Content display objects 56 and contents 57 are displayed in the exhibition booth 55. Also, due to the display condition that the position of the avatar object 52 is within the first determination region 58 being satisfied (see FIGS. 9 to 11), the URL registration display 66 corresponding to the content 57 is displayed as well. The URL registration display 66 is displayed such that the corresponding content 57 can be identified, such as being displayed closest to the corresponding content 57, or the like.

Also, the virtual space screen 80 includes UI elements laid over a virtual space image. The virtual space screen 80 exemplified in FIG. 18 includes a move button 82, and a jump button 81 for causing the avatar object 52 to jump. Further, the virtual space screen 80 includes a photograph button 84, a camera position changing button 85, and message display portions 83 transmitted from watching users 10B. The photograph button 84 includes UI elements for photographing the virtual space screen 80. The camera position changing button 85 is a button for setting the position of the virtual camera 54 to one of first-person perspective and third-person perspective.

Figure 19:
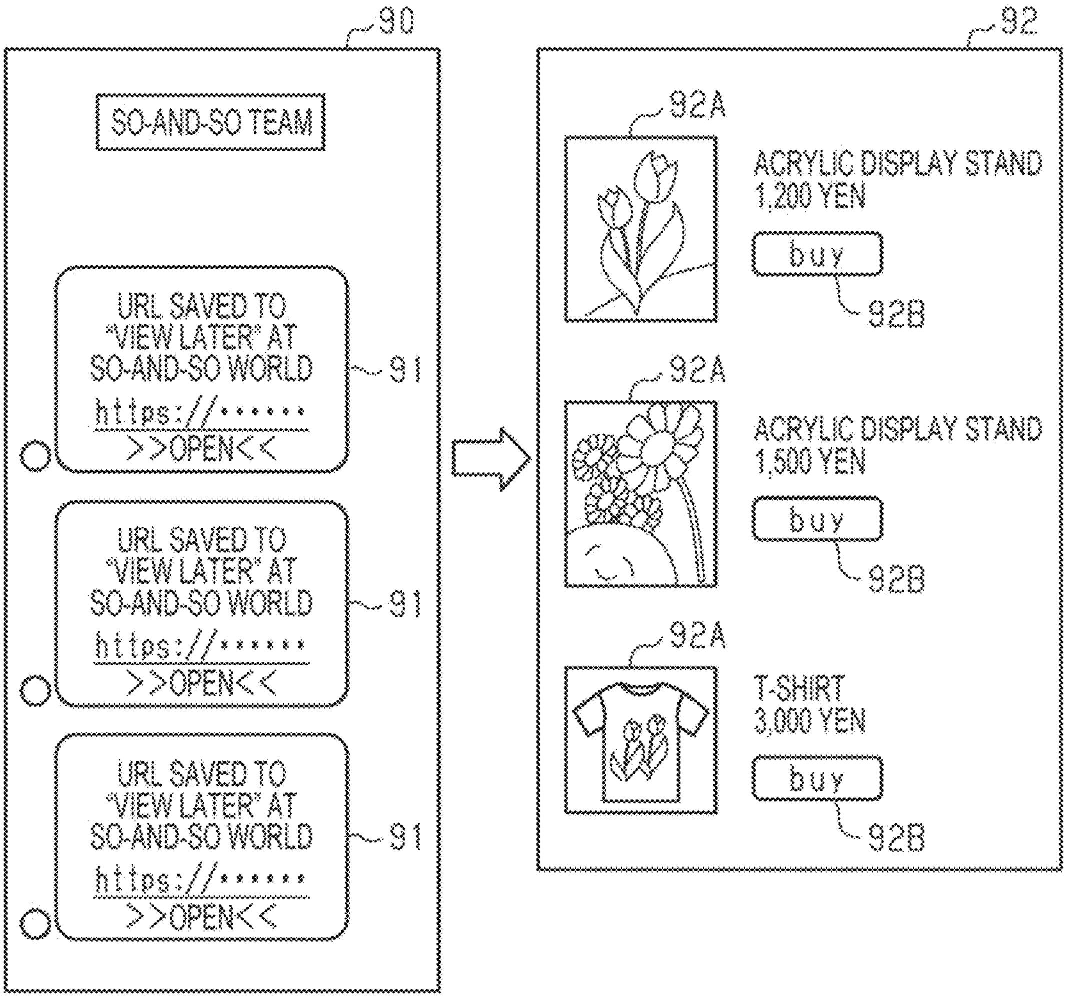
FIG. 19 is a diagram for describing a message display screen displayed on the user device according to the embodiment.

FIG. 19 illustrates an example of a message display screen 90 for the official account. The distributing user 10A checks the message display screen 90 after the distribution ends. The message display screen 90 includes message display portions 91 transmitted by the official account. The message display portions 91 include hyperlinks to URLs. The URLs are URLs associated with the URL registration displays 66 selected by the distributing user 10A.

Upon accepting selection of the hyperlink in one of the message display portions 91, the resource acquisition unit 25 acquires a resource corresponding to that hyperlink from the Web server 13. The third output control unit 26 then displays a resource display screen 92, using the resource that is acquired, on the display unit 109. The resource display screen 92 exemplified in FIG. 19 is an image of a Website including images 92A and UI elements 92B. Users can purchase goods at this Website, for example.

The resource identified by the URL is not limited in particular. For example, in a case in which the content 57 is a digest version of a game, the resource may be an installation screen for a game application. Also, in a case in which the content 57 is something introducing an illustration or an animation moving image, the resource may be a Web site where goods (merchandise) relating to the illustration or the animation can be purchased. In a case in which a link target object 61 is a model of an automobile that is sold in the real world, the resource may be a promotional site for that automobile, or a screen from which reference materials can be downloaded. In a case in which a link target object 61 is an item that can be mounted on the avatar object 52, the resource may be a purchase screen for the item, or a try-on image where the avatar object 52 can try on the item. Also, the URL may be an undisclosed URL that is not detected by search engines.

Figure 20:
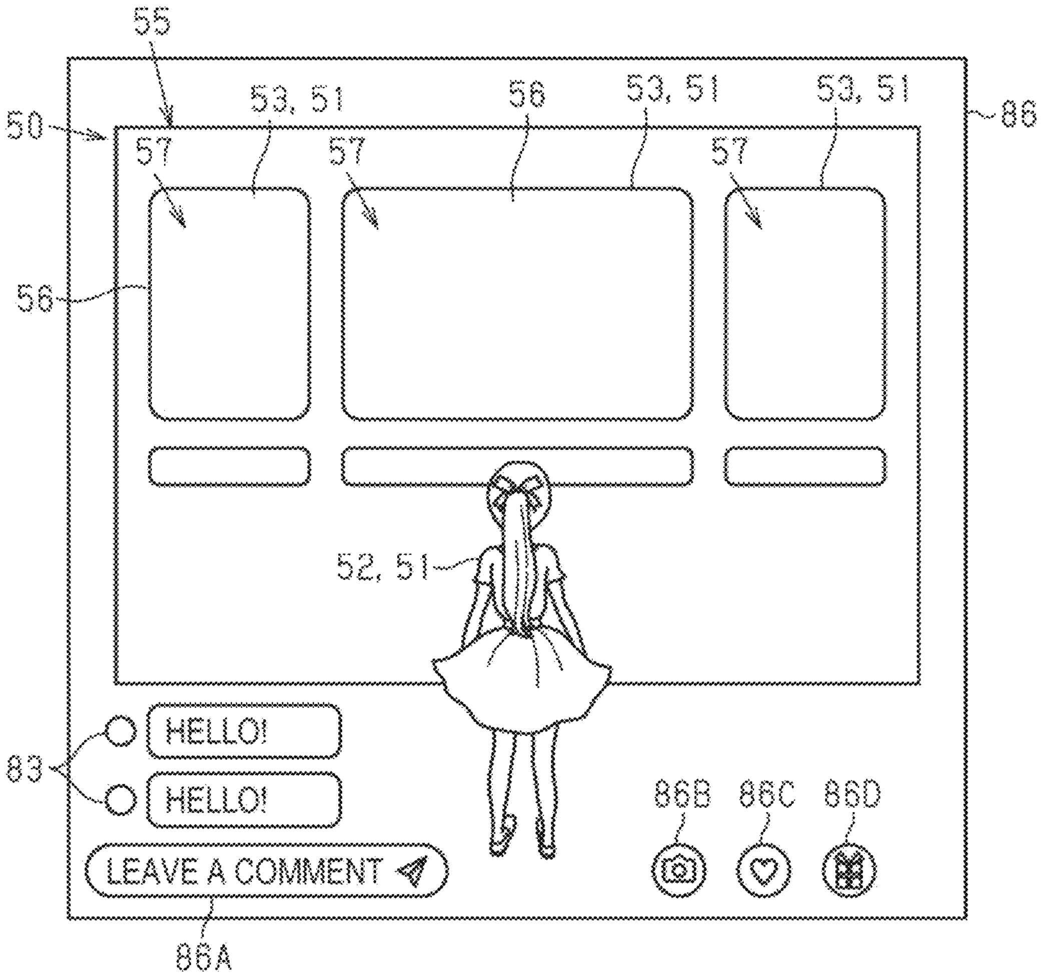
FIG. 20 is a diagram for describing a watching screen displayed on the user device according to the embodiment.

FIG. 20 is a watching screen 86 that is output by the first output control unit 21 of the watching user device 20B. The watching screen 86 displays an image of the virtual space, in the same way as the virtual space screen 80 of the distributing user device 20A. The watching screen 86 includes various types of GUI elements. The GUI elements include, besides the message display portions 83, a comment input portion 86A, a photograph button 86B for photographing the screen, a like button 86C for giving a favorable review to the moving image, and a gift button 86D, for example. The comment input portion 86A is an input form for messages to the distributing user 10A. The watching user device 20B accepts selection of the gift button 86D, and transmits a display request for a gift object to the moving image to the management server 12. The GUI elements displayed in the watching screen 86 can be changed as an appropriate. The watching screen 86 corresponds to "virtual space screen" in the Claims.

The virtual space screen 80 output by the distributing user device 20A and the watching screen 86 output by the watching user device 20B are synchronized. In the present embodiment, the watching user device 20B preferably does not display the URL registration display 66 in the watching screen 86 when the distributing user device 20A is displaying the URL registration display 66 in the virtual space screen 80. The reason is that when the watching user device 20B displays the URL registration display 66 even though the watching user 10B has no right to select the URL registration display 66, the watching user 10B may misunderstand that the URL registration display 66 can be operated. Note, however, that the URL registration display 66 may be displayed on the watching user device 20B in a case in which the URL registration display 66 does not impede watching by the watching user 10B.

The third output control unit 26 acquires the viewing start time and the viewing end time of the resource, and performs recording thereof in the viewing history information storage unit 27, in a manner associated with the URL. Also, the third output control unit 26 records activity history at the resource in the viewing history information storage unit 27. Upon updating the viewing history information, the third output control unit 26 performs transmission thereof to the management server 12.

Effects of the first embodiment will be described.

(1-1) According to the above embodiment, the virtual space screen 80 includes the URL registration display 66 for registering a URL associated with a link target in the virtual space. Also, the hyperlink based on the URL that the user 10 has registered is displayed in a different screen from the virtual space screen 80. Thus, after the distribution ends, the user 10 can open the different screen at an optional timing, and view the resource associated with the link target. Thus, the distributing user 10A can view the resource without inhibiting the distribution.

(1-2) According to the above embodiment, the second output control unit 24 displays the URL registration display 66 on the display unit 109 in a case in which the display condition is satisfied. Accordingly, the user 10 can notice the URL registration display 66 more readily. Also, the URL registration display 66 is displayed only in a case in which the display condition is satisfied, and accordingly the region in which the virtual space is displayed can be made to be larger than a case in which the URL registration display 66 is displayed on the screen at all times.

(1-3) According to the above embodiment, the URL registration display 66 is displayed on the display unit 109 in a case in which the position of the avatar object 52 is included in the first determination region 58. Accordingly, the URL registration display 66 can be dynamically displayed in a case in which the user 10 is assumed to have approached the link target due to interest therein.

(1-4) According to the above embodiment, the achievement recording unit 33 calculates the view count of the resource for each link target, on the basis of the viewing aggregation information 42, and performs recording thereof in the achievement information storage unit 37 as achievement information 43. Accordingly, the presenter of the resource can confirm the publicity effects of the link target.

(1-5) In the above embodiment, only selection of the URL registration display 66 by the distributing user 10A can be accepted. Thus, registration of URLs can be kept to that which is minimally necessary.

(1-6) In the above embodiment, only the distributing user 10A can see the screen including the hyperlink of the URL. Accordingly, the distributing user 10A can collect just URLs that he/she him/herself is interested in.

Second Embodiment

Figure 21:
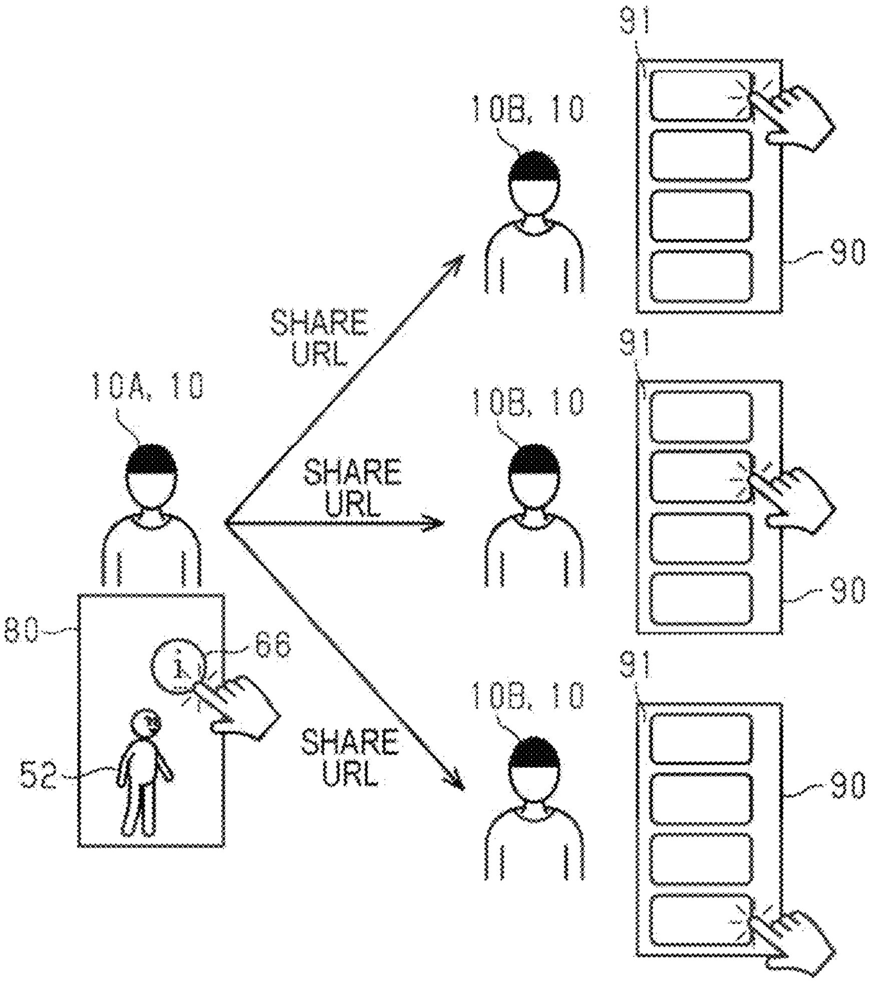
FIG. 21 is a diagram illustrating a registrant of a URL and shares of the URL, according to a second embodiment.

A second embodiment of a program, an information processing method, a server, and an information processing system, will be described below with reference to FIG. 21.

In the second embodiment, only the distributing user 10A can select the URL registration display 66 to register the URL, in the same way as with the first embodiment. The second embodiment differs from the first embodiment with regard to the point that both the distributing user 10A and the watching user 10B can see the screen including the hyperlink of the URL that is registered. That is to say, the distributing user 10A shares the URL that is registered with the watching user 10B. Hereinafter, portions that are the same as in the first embodiment are denoted by the same symbols and detailed description thereof will be omitted.

In the second embodiment, the identification information acquisition unit 23 of the distributing user device 20A acquires a URL from the management server 12 in accordance with a callup instruction of the distributing user 10A (first user). At this time, the management server 12 transmits the URL that is registered to the distributing user device 20A, in a manner associated with an account of a private group including an account of a room (management account) or the distributing user 10A. In the same way, the identification information acquisition unit 23 of the watching user device 20B acquires the URL from the management server 12 in accordance with a callup instruction from the watching user 10B (second user).

The second output control unit 24 of the distributing user device 20A and the second output control unit 24 of the watching user device 20B display the screen including the hyperlink of the URL that is acquired as a separate screen from the virtual space screen 80 and the watching screen 86.

The resource acquisition unit 25 of the distributing user device 20A accepts selection of the hyperlink by the distributing user 10A, and acquires the resource corresponding to the hyperlink. The resource acquisition unit 25 of the watching user device 20B accepts selection of the hyperlink by the watching user 10B, and acquires the resource corresponding to the hyperlink from the Web server 13.

The third output control unit 26 of the distributing user device 20A displays the resource display screen 92 on the display unit 109 using the resource that is acquired. The watching user device 20B displays the resource display screen 92 on the display unit 109 using the resource that is acquired. That is to say, the distributing user 10A shares the URL that he/she him/herself registered while distributing the moving image, with the watching user 10B. Each watching user 10B selects a hyperlink that he/she him/herself is interested in out of links based on URLs registered by the distributing user 10A, and thereby views the resource identified by the URL.

Thus, according to a form in which the distributing user 10A shares URLs, in a moving image being watched by 100 watching users 10B, for example, URLs registered by the distributing user 10A are sent to a great number of watching users. Accordingly, contents 57 and link target objects 63 are presented to a great number of users 10 by distribution of the moving image, and furthermore, a great number of users 10 can be imparted with opportunities to access the resources. Also, the distributing user 10A and the watching user 10B often have common interests. Accordingly, the presenter is able to group these users and devise a marketing strategy that is targeted thereat.

The achievement recording unit 33 records a reward in accordance with achievement information, in a manner associated with the distributing user 10A. specifically, the achievement recording unit 33 calculates the view count for each distributing user 10A in the viewing aggregation information 42. That is to say, the page view count of the resource corresponding to the URL that is shared being viewed is calculated for the moving image distributed by the distributing user 10A. At this time, the achievement recording unit 33 may calculate the page view count for each distributing user 10A and each URL.

A reward is imparted to the distributing user 10A in accordance with the view count. The reward is coins, points, and so forth, that are usable in the application. Alternatively, the reward is an item that can be mounted to the avatar object 52, an emote that can be used in the application, a background, or the like. The achievement recording unit 33 records rewards with a higher value in the user management information 40 in a manner associated with the distributing user 10A, as the view count increases. For example, the achievement recording unit 33 may set the points that are associated in a case in which the view count is "20 times" as being "1,000 points", and set the points that are associated in a case in which the view count is "100 times" as being "10,000 points".

According to the second embodiment, the following effects can be obtained, in addition to the effects described in (1-1) to (1-5) according to the first embodiment.

(2-1) In the second embodiment, the screen including the hyperlink of the URL can be seen by not only the distributing user 10A but also the watching user 10B as well. Accordingly, the watching user 10B can see the resource associated with the URL selected by the distributing user 10A. Also, opportunities for the resource to be viewed are increased, and thus the publicity effects of the resource can be increased.

(2-2) In the second embodiment, the achievement recording unit 33 imparts a reward to the distributing user 10A in accordance with the view count of the resource of the URL that the distributing user 10A registered. Also, a reward with a higher value is recorded in association with the distributing user 10A as the view count increases. That is to say, distributing users 10A who are popular can readily obtain rewards with high values. This can motivate users 10 to distribute moving images.

Third Embodiment

A third embodiment of a program, an information processing method, a server, an information processing method of the server, and an information processing system, will be described below with reference to FIG. 22.

The third embodiment differs from the first embodiment and the second embodiment with regard to the point that both the distributing user 10A and the watching user 10B can select the URL registration display 66. The third embodiment differs from the first embodiment with regard to the point that both the distributing user 10A and the watching user 10B can see the screen including the hyperlink. Hereinafter, portions that are the same as in the first embodiment are denoted by the same symbols and detailed description thereof will be omitted.

In the third embodiment, the first output control unit 21 of the watching user device 20B receives drawing data for outputting a moving image from the distributing user device 20A that the distributing user 10A (first user) uses, and outputs a virtual space screen including the URL registration display 66 as well.

In a case of accepting selection of the URL registration display 66 by the watching user 10B (second user), the identification information registration unit 22 records the URL in the storage unit in a manner associated with the watching user 10B. In the present embodiment, the storage unit is the registration information storage unit 35.

The identification information acquisition unit 23 acquires the URL in accordance with a callup instruction by the watching user 10B.

The second output control unit 24 of the watching user device 20B displays a screen including the hyperlink based on the URL registered by the watching user 10B as a separate screen from the virtual space screen 80.

The resource acquisition unit 25 accepts selection of the hyperlink by the watching user 10B, and acquires the hyperlink. The third output control unit 26 outputs a screen using the resource, to the display unit 109.

Figure 22:
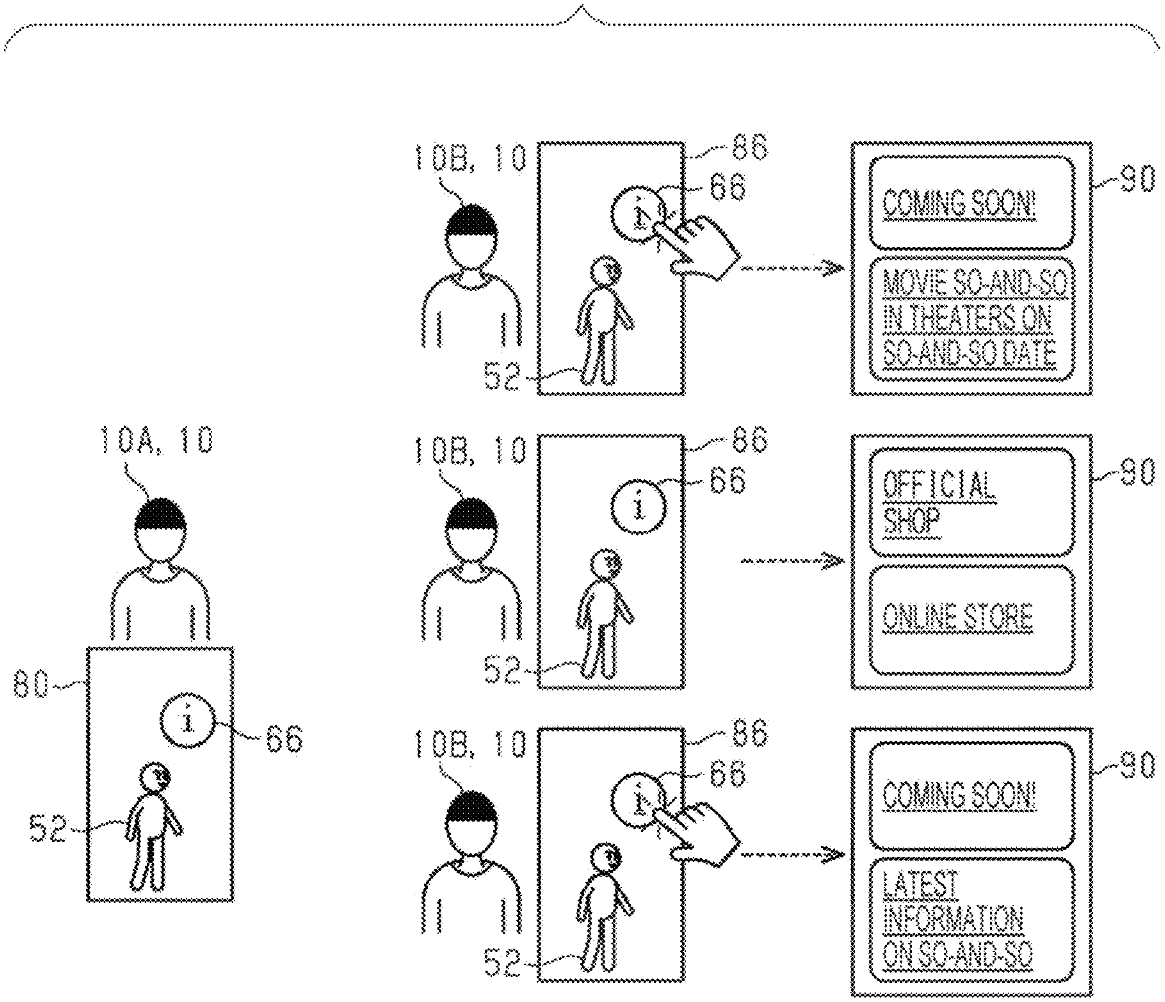
FIG. 22 is a diagram illustrating a registrant of a URL according to a third embodiment.

As illustrated in FIG. 22, the distributing user device 20A outputs the virtual space screen 80 with the URL registration display 66 included therein. The watching user device 20B outputs the watching screen 86 including the virtual space image corresponding to the position of the avatar object 52 of the distributing user 10A and the URL registration display 66.

In the same way as in the first embodiment, in a case of the distributing user 10A selecting the URL registration display 66, the distributing user device 20A associates the URL with the user ID of the distributing user 10A and performs transmission thereof to the management server 12. The registration unit 31 of the management server 12 records the URL that is received in the registration information storage unit 35 in a manner associated with the user ID of the distributing user 10A.

The watching user 10B can select, out of the URL registration displays 66 displayed in the watching screen 86, just the URL registration displays 66 that interest him/herself, at an optional timing. Note, however, that only the distributing user 10A can satisfy the display conditions of the URL registration display 66 here. The watching user device 20B associates the URL with the user ID of the watching user 10B, and performs transmission thereof to the management server 12. The registration unit 31 of the management server 12 records the URL that is received in the registration information 41, in a manner associated with the user ID of the watching user 10B.

In the same way as the first embodiment, the distributing user 10A and the watching user 10B can call up the message display screen 90 at an optional timing.

The message display screen 90 may be a chat screen with a management account, such as an official account of the application, an official account of the room, or the like. Also, the hyperlinks collected by the watching users 10B may differ from one watching user 10B to another, since the watching users 10B acquire URLs corresponding to link targets that interest themselves. Accordingly, the watching users 10B can enjoy watching the moving image, and also can collect information that interests themselves.

Calculation of Achievements

The achievement recording unit 33 calculates the view count of the resource for each distributing user, and then records a reward corresponding to the view count, in a manner associated with each distributing user 10A, in the same way as in the second embodiment. Also, the achievement recording unit 33 records a selection count, which is the count of times of the URL registration display 66 being selected, included in the achievement information 43, on the basis of the selection information. In this case, the user device 20 transmits selection history information to the management server 12 in a case in which the URL registration display 66 is selected. The management server 12 calculates the selection count for each link target, on the basis of the selection history information. Also, the management server 12 may calculate the selection count for each distributing user 10A, on the basis of the selection history information. In this case, storing may be performed in a manner with the reward associated with the distributing user 10A, in accordance with the selection count.

According to the third embodiment, the following effects can be obtained, in addition to the effects described in (1-1) to (1-4) according to the first embodiment and (2-1) and (2-2) according to the second embodiment.

(3-1) In the above embodiment, not only the distributing user 10A but also the watching user 10B can select the URL registration display 66. Accordingly, the watching user 10B can collect URLs of link targets that he/she him/herself are interested in, while watching the moving image. Also, enabling the watching user 10B to also collect URLs further increases opportunities for resources to be presented, and thus the publicity effects of the resources can be increased.

(3-2) In the above embodiment, the achievement recording unit 33 calculates the selection count in which the URL registration display 66 was selected, for each link target. Accordingly, the proportion of the view count as to the selection count in which the URL registration display 66 was selected can be calculated, along with the viewing aggregation information 42. Also, in a case of calculating the selection count for each distributing user 10A, the distributing user 10A can be imparted with a reward corresponding to the selection count.

Fourth Embodiment

A fourth embodiment of a program, an information processing method, a server, an information processing method of the server, and an information processing system, will be described below with reference to FIGS. 23 and 24. Hereinafter, portions that are the same as in the first embodiment are denoted by the same symbols and detailed description thereof will be omitted.

In the present embodiment, the link target is shared information that is displayed by using an in-app browser on the basis of operations of the distributing user 10A (first user). The first output control unit 21 outputs a screen of the virtual space 50 including a URL registration display 66 associated with the shared information. In a case of accepting selection of the URL registration display by the watching user 10B (second user), the identification information registration unit 22 records the URL of the resource associated with the shared information in the registration information storage unit 35, in a manner associated with the watching user 10B.

In the present embodiment, the virtual space 50 includes a display object 67. The display object 67 is an example of the object 51, and has the same configuration as the content display object 56. The display object 67 differs from the above embodiments with respect to the point that shared information 68 that the distributing user 10A shares can be displayed. The shared information 68 is the resource in the above embodiments. For example, the shared information 68 is a screen that the in-app browser outputs using Web data. Alternatively, the shared information 68 may be images such as still images in JPEG format, GIF format, PNG format, or the like, moving images based on moving image data such as MPEG4 or the like, and so forth. The display object 67 is displayed as a digital signage, display unit, screen, of the like, for example.

The first output control unit 21 projects the resource on the display object 67, as the shared information 68 to be shared between the distributing user 10A and the watching user 10B. For example, the first output control unit 21 projects the resource on the display object 67 using a technique such as texture mapping or the like. Also, the first output control unit 21 displays the URL registration display 66 in a manner associated with the display object 67. The first output control unit 21 may constantly display the URL registration display 66 associated with the display object 67 during a period in which the display object 67 is displayed. Alternatively, the first output control unit 21 may display the URL registration display 66 only in a case in which the display condition in the above embodiments is satisfied. The URL registration display 66 is associated with the URL of the resource displayed on the display object 67. The first output control unit 21 changes the URL associated with the URL registration display 66 when the resource displayed on the display object 67 is changed on the basis of operations by the user 10 or the like.

In the same way as in the above embodiments, the distributing user device 20A can register a URL identifying the resource in the management server 12 in a case in which the URL registration display 66 is selected. On the other hand, the distributing user device 20A can output resources to the display object 67 as the shared information 68 on the basis of predetermined operations by the distributing user 10A for displaying the resource (operations that are separate from selecting operations of the URL registration display 66).

In a case in which a display range that is an output result of the shared information 68 is larger than the display region of the display object 67, the first output control unit 21 causes the display region of the shared information 68 to be changed (scrolled) on the basis of input operations by the distributing user 10A. The first output control unit 21 causes the shared information 68 to be vertically scrolled on the basis of input operations of tracing the screen in an up-down direction. Alternatively, the first output control unit 21 causes the shared information 68 to be horizontally scrolled on the basis of input operations of tracing the screen in a right-left direction. The input operations are swiping operations, flicking operations, or the like. The first output control unit 21 decides the amount of scrolling on the basis of the amount of the input operations on the screen by the distributing user 10A.

Figure 23:
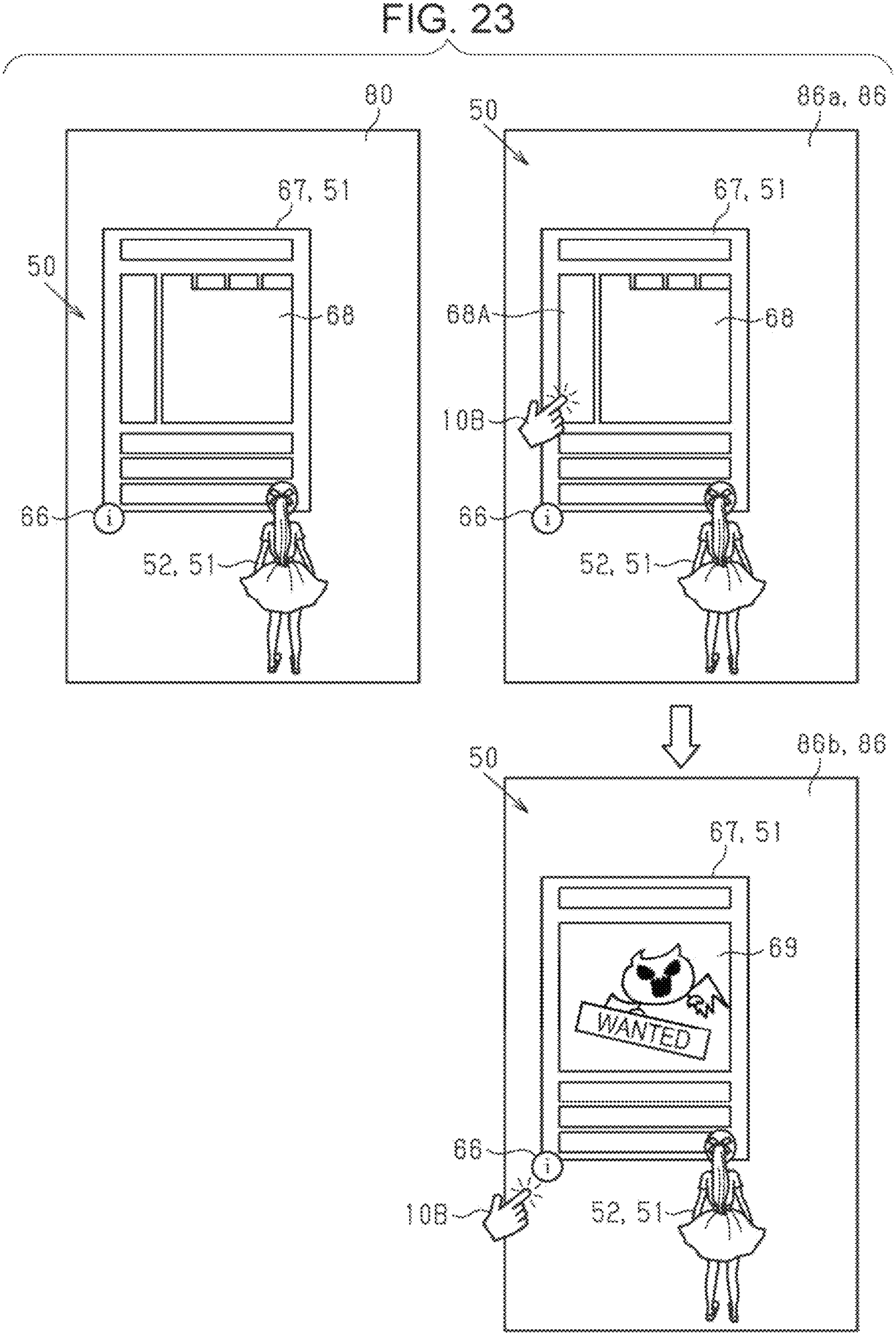
FIG. 23 is a diagram illustrating a distribution screen and a watching screen according to a fourth embodiment.

FIG. 23 illustrates the virtual space screen 80 displayed on the distributing user device 20A, and the watching screen 86 displayed on the watching user device 20B. When the distributing user device 20A outputs the virtual space screen 80 including the display object 67, the watching user device 20B also outputs the watching screen 86 including the display object 67.

The distributing user device 20A transmits the URL of the resource to be displayed on the display object 67 to the management server 12. The first output control unit 21 of the watching user device 20B acquires the URL from the management server 12. The first output control unit 21 also acquires the resource identified by the URL that is acquired from the Web server 13. The first output control unit 21 projects the resource that is acquired on the display object 67 as the shared information 68.

The first output control unit 21 of the distributing user device 20A scrolls the image of the shared information 68, on the basis of input operations by the distributing user 10A. The first output control unit 21 also transmits the amount of input operations to the watching user device 20B via the management server 12. The first output control unit 21 of the watching user device 20B scrolls the screen on the basis of the amount of input operations that is received. Thus, the image displayed on the display object 67 included in the virtual space screen 80 and the image displayed on the display object 67 included in the watching screen 86 are synchronized.

The watching user device 20B does not scroll the image of the shared information 68 even when the watching user 10B performs input operations for scrolling with respect to the shared information 68. On the other hand, the watching user device 20B accepts selection operations performed with respect to the image of the shared information 68, as illustrated in a watching screen 86*a* to the upper right in FIG. 23. The selection operations are, for example, tapping operations. The first output control unit 21 of the watching user device 20B acquires a link associated with a position at which the selection operations are performed (selected position). The first output control unit 21 of the watching user device 20B then acquires the resource identified by the URL corresponding to the link from the Web server 13, and also outputs the resource using the in-app browser. At this time, in a case in which the URL corresponding to the link is included in a list stored in the watching user device 20B in advance, or in a list stored in the management server 12, the first output control unit 21 uses the in-app browser to display the resource on the display object 67 or on a screen other than the display object 67. In a case in which the URL corresponding to the link is not included in a list stored in the watching user device 20B in advance, the first output control unit 21 uses a standalone browser or another application to display the resource on the display object 67 or on a screen other than the display object 67.

Assumption will be made that the watching user 10B selects a banner 68A, which is a part of the image of the shared information 68, as illustrated in the watching screen 86*a* in FIG. 23. The first output control unit 21 of the watching user device 20B uses a link corresponding to the banner 68A to acquire the resource from the Web server 13. The first output control unit 21 of the watching user device 20B then outputs a transition screen 69 of the resource that is acquired to the display object 67, as illustrated in a watching screen 86*b* at the lower right in FIG. 23.

The watching screen 86 is synchronized with the virtual space screen 80 displayed on the distributing user device 20A at a predetermined timing. Accordingly, there is a problem in that even though the watching user 10B displays the transition screen 69, the transition screen 69 will be erased in a case of the watching user device 20B receiving updating data of the screen that is transmitted from the distributing user device 20A. Accordingly, in a case in which the watching user 10B wants to view the transition screen 69 later, the watching user 10B selects the URL registration display 66 associated with the display object 67. Accordingly, the identification information registration unit 22 of the watching user device 20B transmits the URL for the transition screen 69 that is the link target to the management server 12, in a manner associated with the watching user 10B. The registration unit 31 of the management server 12 records the URL and the user ID of the watching user 10B in the registration information storage unit 35.

Note that in a case in which the URL registration display 66 is displayed in the watching screen 86*a*, the watching user device 20B can accept selection of the URL registration display 66 at all times. That is to say, selection of the URL registration display 66 can be accepted in the watching screen 86*a* as well.

Figure 24:
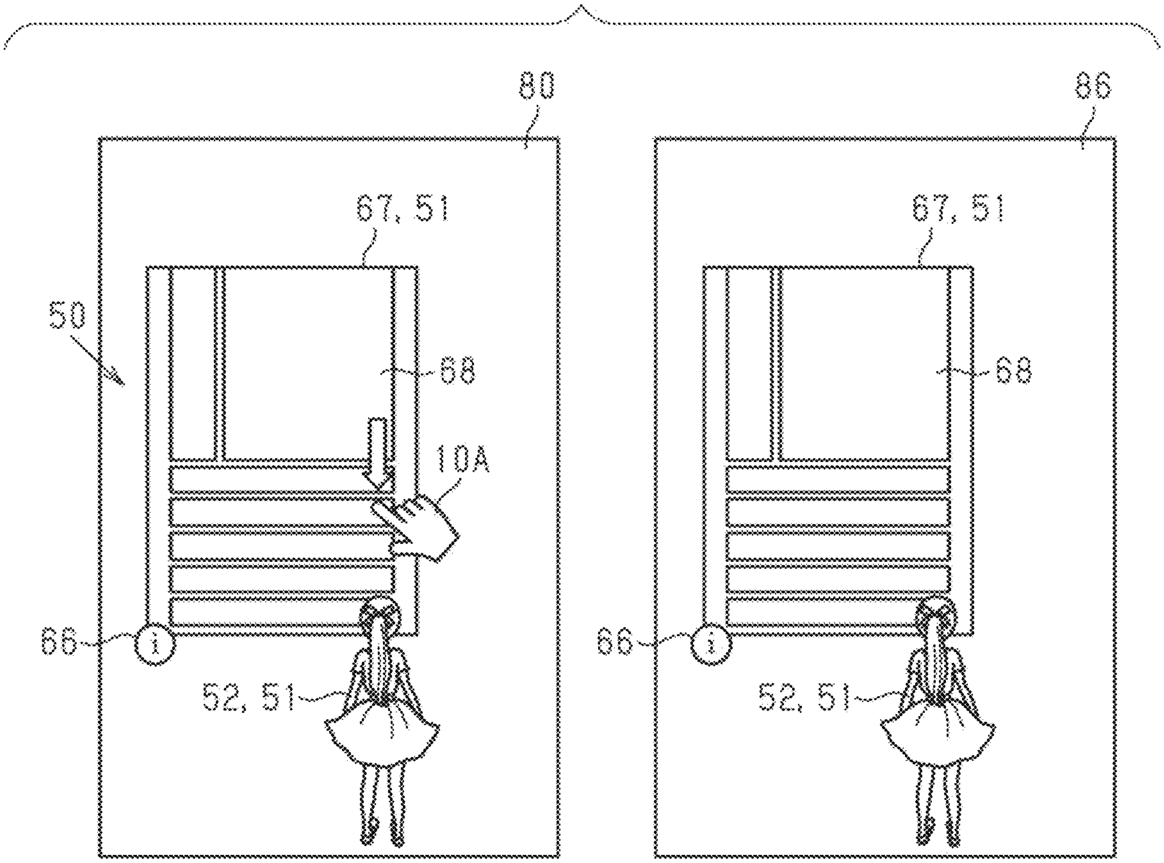
FIG. 24 is a diagram illustrating the distribution screen and the watching screen according to the fourth embodiment.

FIG. 24 illustrates the virtual space screen 80, and the watching screen 86 displayed after the watching user device 20B displays the watching screen 86*b*. The virtual space screen 80 illustrated in FIG. 24 is displayed after the virtual space screen 80 illustrated in FIG. 23 is displayed. As described above, the virtual space screen 80 and the watching screen 86 are synchronized at predetermined timings. That is to say, as illustrated in the watching screen 86*b* in FIG. 23, in a case of receiving various types of data for updating the screen from the distributing user device 20A, the first output control unit 21 of the watching user device 20B outputs the watching screen 86 using the various types of data for updating. In a case in which the first output control unit 21 of the distributing user device 20A scrolls the image of the display object 67, the first output control unit 21 of the watching user device 20B also scrolls the image of the display object 67.

After ending watching of the distribution of the moving image, the watching user 10B calls up the message display screen 90. The watching user 10B can then view the transition screen 69 again by selecting the link displayed in the message display screen 90.

Note that the distributing user 10A may be imparted with a reward in accordance with the view count of the resource in the present embodiment as well, in the same way as with the second embodiment. Further, the selection count of the URL registration display 66 may be calculated and also a reward may be imparted to the distributing user 10A in accordance with the selection count, in the same way as in the third embodiment.

According to the fourth embodiment, the following effects can be obtained, in addition to the effects described in (1-1) to (1-4) according to the first embodiment, (2-1) and (2-2) according to the second embodiment, and (3-1) and (3-2) according to the third embodiment.

(4-1) According to the above embodiment, in a form in which the watching user device 20B updates the shared information 68 synchronously with the distributing user device 20A, the watching user 10B can register the URL of a resource that he/she wants to view later. Accordingly, the watching user 10B can open the separate screen at an optional timing after ending of watching, and can see the resource that is associated with the link target. Thus, the watching user 10B can view the resource without the watching being impeded.

The above embodiments can be carried out modified as follows. The above embodiments and the following modifications can be carried out in combination insofar as no technical contradiction arises.

Collab Distribution

The distributing user device 20A is capable of distributing a moving image in which the virtual positions of a plurality of distributing users 10A are situated in the same virtual space. A plurality of users distributing a moving image in the same virtual space is referred to as "collaboration distribution". Hereinafter, the distributing user 10A that performs a generation request for a room that is a virtual space shared by a group of distributing users 10A will be referred to as a "host user", and the distributing users 10A participating in the room generated by the host user will be referred to as "guest users"

The users 10 can participate in the collaboration distribution as guest users by accepting a participation request from the host user, or a participation request transmitted by the users 10 being approved by the host user.

In a case of performing the collaboration distribution in the first embodiment, the distributing user device 20A of the host user and the distributing user devices 20A of the guest users output the virtual space screen 80 including the URL registration display 66 to the display unit 109. The host user and the guest users can select the URL registration display 66. The registration unit 31 of the management server 12 records the URL and the user IDs of the distributing users 10A in the registration information storage unit 35 in an associated manner. Both the host user and the guest users can view the screen including the hyperlink, and view the screen using the resource corresponding to the hyperlink.

At this time, the watching user device 20B is in a form that is the same as one of the above embodiments. The watching user 10B may watch the moving image that the host user distributes, or may watch the moving image distributed by a user 10 that the watching user 10B selects out of the host user and the guest users.

URL Registration Display

In the above embodiments, the URL registration display 66 is described as being a URL registration display 66 that is a GUI. Alternatively, or additionally, the URL registration display 66 may be displayed as a section of the virtual space. The identification information registration unit 22 may acquire the URL when the avatar object 52 is situated in this section.

In the above embodiments, the identification information registration unit 22 acquires the URL when the URL registration display 66 is selected. Alternatively, the identification information registration unit 22 may be arranged to acquire the URL when determination is made that a positional relation between a predetermined object such as the link target object 61 or the like and the avatar object 52 is a relation that is set in advance. A positional relation that is set in advance is, for example, the avatar object 52 and the predetermined object coming into contact. Alternatively, the identification information registration unit 22 may be arranged to acquire the URL in a case of determining that a predetermined word (e.g., "view later") is included in a text string obtained by the user device 20 performing speech recognition processing of speech uttered by the user.

In the above embodiments, the URL registration displays 66 are displayed in a case in which the display condition is satisfied. Alternatively, the URL registration displays 66 may continue to be displayed in association with respective link targets.

A plurality of URLs may be associated with one content 57. For example, in a case of one content 57 being made up of sequential output of "moving image file A", "moving image file B", and "moving image file C" by the user device 20, a different URL may be associated with each moving image file. In this case, when the user 10 views a moving image based on "moving image file A", a URL registration display 66 that is associated with the resource corresponding to the "moving image file A" is displayed. Thus, the user 10 can narrow down resources to be viewed to just those that interest him/her.

The URL associated with a link target may be registered along with time. For example, upon the user 10 who is watching a live music performance in the virtual space 50 selecting a URL registration display 66, the identification information registration unit 22 of the user device 20 transmits the time of accepting selection and the URL to the management server 12. The registration unit 31 of the management server 12 records the time and the URL in the registration information storage unit 35. The user device 20 receives the time and the URL from the management server 12 and also transmits the time and the URL to the Web server 13. The Web server 13 reads the moving image data of the live music performance corresponding to the URL, and also transmits moving image data from the time of reception thereafter. Alternatively, the user device 20 outputs the moving image data of the live music performance from the time and thereafter.

In the fourth embodiment, the distributing user device 20A displays the URL registration display 66 on the virtual space screen 80. Alternatively, or additionally, the distributing user device 20A may be capable of outputting the resource to the display object 67 on the basis of a predetermined operation by the distributing user 10A, and on the other hand does not have to display the URL registration display 66. In this form as well, the watching user device 20B displays the URL registration display 66 on the virtual space screen 80. According to this form, the watching user 10B can watch the moving image regarding which the distributing user device 20A displays the resource on the display object 67, and can also register URLs of resources in which he/she is interested.

First Output Control Unit

In the above embodiments, the first output control unit 21 of the user device 20 is arranged to distribute and watch moving images by the client rendering scheme, but may be arranged to perform distribution and watching by the schemes described above. The browser rendering scheme is a method in which the distributing user device 20A and the watching user device 20B display moving images using a standalone Web browser stored in the storage 104. At this time, the distributing user device 20A transmits drawing data and so forth to the management server 12. The user device 20 displaying the moving image receives Web data from the management server 12 that is described in a markup language such as HTML or the like and that uses CSS, JavaScript (registered trademark), or the like. The Web browser program activated at the user device 20 draws avatar objects and other object by JavaScript running on the browser. According to this scheme, model data and so forth of the avatar object is not stored in the user device 20. In a case of the browser rendering scheme, the application does not have to be installed in the user device 20. Alternatively, the user device 20 may have the application including the in-app browser installed therein.

In the browser rendering scheme, at least one of known methods such as Static Server-Side Rendering, Server-Side Rendering, Client-Side Rendering, CSR with Prerendering, SSR with (Re) Hydration, and so forth can be used as a scheme for generating files to display in the virtual space screen 80 and the watching screen 86 by rendering. Rendering as used here is to interpret data described in a markup language or the like, and to calculate the layout of image elements and text for display on the virtual space screen 80 and the watching screen 86.

In static rendering, a static HTML file is recorded in the Web server 13 in advance. The user device 20 downloads the static HTML file from the Web server 13. The user device 20 outputs the rendered HTML file to the display unit 109 and displays the virtual space screen 80 and the watching screen 86. In Server-Side Rendering (SSR), the Web server 13 performs rendering and so forth in response to a request from the user device 20, and also transmits the rendered HTML file to the user device 20. The user device 20 outputs the HTML file that is downloaded to the display unit 109 and displays the virtual space screen 80 and the watching screen 86. Note that the Web server 13 includes an application server. In Client-Side Rendering (CSR), the user device 20 performs rendering by executing JavaScript (registered trademark). At this time, the user device 20 downloads a simple HTML file from the Web server 13, and also downloads JavaScript (registered trademark) and CSS files and so forth as necessary. In CSR with Prerendering, which is a type of CSR, the user device 20 generates and records a part of HTML files in advance, and downloads contents that are necessary in accordance with requests from the Web server 13 and perform rendering thereof. In SSR with (Re) Hydration, the Web server 13 generates and records an HTML file that is not rendered. The user device 20 downloads the HTML file from the Web server 13, and also downloads data that is necessary on the basis of the HTML, and performs rendering. Note that in the above schemes, the user device 20 may be arranged to acquire data that is necessary from the management server 12 instead of the Web server 13.

The video distribution scheme is a scheme in which the distributing user device 20A generates moving image data. Specifically, the distributing user device 20A draws objects using motion data and so forth, thereby generating moving image data. Also, the distributing user device 20A transmits moving image data and audio data that are encoded to the management server 12. The management server 12 transmits the moving image data and the audio data to the watching user device 20B. The watching user device 20B displays a moving image on the display unit 109 on the basis of the moving image data received from the distributing user device 20A.

The server distribution scheme is a scheme in which the management server 12 generates moving image data. The management server 12 receives motion data and audio data from the distributing user device 20A. The management server 12 generates moving image data on the basis of this data. The management server 12 transmits the moving image data that is generated to the distributing user device 20A and the watching user device 20B. The distributing user device 20A and the watching user device 20B output moving images to the display unit 109 on the basis of the moving image data that is received.

Thus, one of the user device 20 and the management server 12 serves to generate moving image data. The device that serves to generate moving image data can be changed in accordance with the distribution scheme.

In the above embodiments, the condition for displaying the URL registration display 66 is that the position of the avatar object 52 in the virtual space 50 is included within the first determination region 58. Also, the second determination region 59 for determining the necessity to display questionnaire response items is set within the virtual space 50. Alternatively, or additionally, a determination region for playing the content 57 of the moving image may be provided. Upon determining that the position of the avatar object 52 is included within the first determination region, the first output control unit 21 plays the content 57.

In the above embodiments, the link target of the content 57 and so forth are images such as still images, moving images, and so forth. The link target also includes a browser screen displayed by using the in-app browser or the like. In this form, the user device 20 receives data for displaying a screen from the Web server 13. The in-app browser is the used to display the browser image on the content display object 56 or the like. The browser screen includes still images, and moving images as well.

Identification Information Registration Unit

In the above embodiments, the identification information registration unit 22 records the URL in the registration information storage unit 35 of the management server 12. Alternatively, or additionally, the identification information registration unit 22 may be arranged to record the URL in the storage 104 of the user device 20. The identification information acquisition unit 23 acquires the URL from the storage 104 upon accepting a callup instruction from the user 10.

Second Output Control Unit

In the above embodiments, the screen including the hyperlink is the message display screen 90. Alternatively, or additionally, the second output control unit 24 may display a list screen of hyperlinks.

Figure 25:
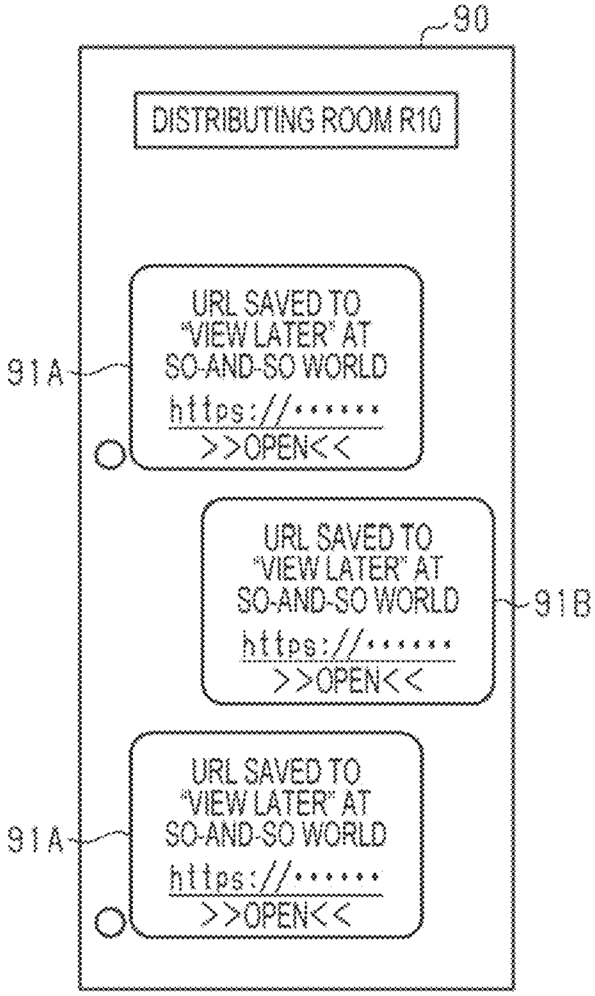
FIG. 25 is a diagram for describing a message display screen according to a modification.

As illustrated in FIG. 25, the second output control unit 24 may be arranged to output the message display screen 90 displaying messages 91A and 91B that are exchanged among members belonging to the group. The message 91A is a message transmitted by a user 10 of another device. The message 91B is a message transmitted by the user 10 of the own device. The group is a group made up of distributing users 10A and watching users 10B, a group made up of a host user and guest users in a collaboration distribution, or the like. According to this form, user belonging to the group can share resources of interest with each other, and accordingly communication can be promoted. This is also advantageous for the presenter in that the resources can be presented to a greater number of users 10.

Resource Acquisition Unit and Third Output Control Unit

In the above embodiments, the resource that the resource acquisition unit 25 acquires is a Web page identified by a URL. Other than this, the resource may include at least one of the following.

An object that is displayable in virtual space, such as an item or the like that can be mounted on an avatar.

An image other than an object, such as a background, an effect, or the like, which can be displayed in virtual space.

Emote data that causes an avatar object to perform an action.

Audio data that can be output by the user device 20.

At this time, the screen including the hyperlink that is displayed by the third output control unit 26 may be a message display screen in the same way as in the above embodiments. Alternatively, the screen including the hyperlink may be a screen that displays a digest version of the resource, a thumbnail image, or the like.

The third output control unit 26 is arranged to record viewing history information in the viewing history information storage unit 27. Also, the third output control unit 26 is arranged to transmit the viewing history information to the management server 12. Alternatively, the third output control unit 26 does not have to store the viewing history information. The viewing history information reception unit 32 of the management server 12 may receive the viewing history information from the Web server 13.

Management Server

As described above, it is sufficient for the management server 12 to be made up of one server device having a plurality of virtual servers, or a plurality of physical servers. For example, the management server 12 may be made up of a server having the distribution management unit 30, a server having the registration unit 31, a server having the viewing history information reception unit 32, and a server having the achievement recording unit 33.

Registration Information Storage Unit

The user device 20 may have the registration information storage unit 35 of the management server 12. Note that in a case in which the user device 20 records the URLs, the registration unit 31 and the registration information storage unit 35 of the management server 12 may be omitted.

Viewing History Information Reception Unit

The viewing history information reception unit 32 may receive viewing information from the Web server 13. The Web server 13 has recorded therein an access log of resources identified by URLs that the users 10 can register. The access log includes date and time of connection (viewing start time), date and time of disconnection (viewing end time), identification information of user devices 20 that are connected, contents of operations, and so forth. The Web server 13 transmits the access log to the management server 12. The viewing history information reception unit 32 of the management server 12 records the access log that is received in the viewing aggregation information storage unit 36 as the viewing aggregation information 42. The achievement recording unit 33 records the achievement information 43 based on the access log in the achievement information storage unit 37.

Avatar Object

In the above embodiments, the user device 20 is arranged to draw the avatar object 52 corresponding to the distributing user 10A using tracking data that detects actions of the distributing user 10A, or mote data. Accordingly, actions of the distributing user 10A, or actions selected by the distributing user 10A, are reflected in the avatar object 52. Alternatively, or additionally, the user device 20 may be arranged to temporarily or consecutively draw the avatar object 52 without using tracking data and emote data. In this form, the load of drawing processing on the user device 20 can be reduced when drawing a great number of the avatar objects 52 in the virtual space 50.

In the above embodiments, the user device 20 is arranged to draw the avatar object 52 corresponding to the distributing user 10A. Alternatively, the user device 20 may draw an image of the virtual space 50 in first-view perspective, and does not have to draw the avatar object 52.

In the above embodiments, the user device 20 is arranged to draw the avatar object 52 corresponding to the distributing user 10A. Alternatively, or additionally, the user device 20 may be arranged to draw the avatar object 52 corresponding to the watching user 10B. The user device 20 may be arranged to draw the avatar object 52 corresponding to the watching user 10B in a form that incurs a smaller processing load as compared to the avatar object 52 corresponding to the distributing user 10A. A form that incurs a smaller processing load is, for example, displaying the avatar object 52 corresponding to the watching user 10B as a two-dimensional image, not reflecting motion data in the avatar object 52 corresponding to the watching user 10B, not outputting audio of the watching user 10B, or the like. In this case, display and selection of the URL registration display 66 by the watching user device 20B, display of the message display screen 90, selection of the hyperlink and display of the resource, are the same as in the first to third embodiments.

Application

In the above embodiments, an in-app browser is arranged to be used as the application. Other than this, the application may be a native application that is installed in the user device 20. Alternatively, the user device 20 may display various types of screens, such as the virtual space screen, the watching screen, and so forth, using a standalone browser, instead of using the installed application.

Distribution of Moving Image

In the above embodiments, the distributing user device 20A was presumed to be distributing the moving image. Alternatively, or additionally, the application installed in the user device 20 may be an application that enables the user 10 to move through the virtual space 50, without distributing the moving image. The user device 20 may display the virtual space screen 80 on the basis of operations by the user, by executing the program. In this case, the user 10 activates the application, and selects a virtual space 50 that is desired. The user device 20 displays a virtual space screen of the virtual space 50 as seen from each virtual camera 54. In this form, the user 10 can display and select the URL registration display 66, display the message display screen 90, and perform selection of the hyperlink and display of the resource, in the same way as the distributing user 10A in the first embodiment.

User

In the above embodiments, "distributing user 10A" means a user on a side of transmitting at least one of information relating to images (video) and information relating to audio. For example, the distributing user 10A is a user that independently executes distribution of moving images and collaboration distribution in which a plurality of people can participate. Alternatively, it is sufficient for the distributing user 10A to be a user organizing or accommodating a video chat or a voice chat regarding which at least one of participation by a plurality of people and watching by a plurality of people can be performed, or an event (a party or the like) in the virtual space regarding which at least one of participation by a plurality of people and watching by a plurality of people can be performed. That is to say, the distributing user 10A can be said to be, in other words, a host user, an organizing user, or an accommodating user.

On the other hand, "watching user 10B" means a user on a side of receiving at least one of information relating to video and information relating to audio. Note, however, that the watching user 10B can also make reactions, not just receiving the above information. For example, the watching user 10B is a user that watches moving image distribution and collaboration distribution. Also, it is sufficient for the watching user 10B to be a user performing at least one of participation in or watching of a video chat, voice chat, or event. Accordingly, the watching user 10B can be said to be, in other words, a guest user, a participating user, a listener, a spectating user, a supporting user, and so forth.

Information Processing System

In the above embodiments, the user device 20 is described as being an information processing device such as a smartphone, a mobile telephone, a tablet terminal, a personal computer, a console gaming device, wearable computer such as a head-mounted display, or the like. Alternatively, the information processing system may be a system provided in a studio for moving image distribution. The information processing system includes an information processing device, a server, a sensor unit mounted on the body of the distributing user 10A, a tracking system for detecting the position of the sensor unit, an operating unit, a speaker, a display unit, and so forth. The tracking system may have a multi-axial laser emitter for emitting pulsed laser light for synchronizing. The sensor unit has a sensor that detects laser light, and detects the position and orientation of itself while synchronizing using synchronizing pulses.

The user device 20 is arranged to function as the first output control unit 21, the identification information registration unit 22, the identification information acquisition unit 23, the second output control unit 24, the resource acquisition unit 25, and the third output control unit 26, by execution of the application. At least one of these functions may be executed by the management server 12 or another device making up the information processing system 11. Also, the management server 12 is arranged to function as the distribution management unit 30, the registration unit 31, the viewing history information reception unit 32, and the achievement recording unit 33, by execution of the program. At least one of these functions may be executed by the user device 20 or another device making up the information processing system 11. Also, the management server 12 is arranged to include the user management information storage unit 34, the registration information storage unit 35, the viewing aggregation information storage unit 36, and the achievement information storage unit 37. At least one of these may be included in the user device 20 or another device making up the information processing system 11. For example, the user device 20 may include the registration information storage unit 35. In this case, the user device 20 records URLs that are acquired in a storage that is accessible by the application. In a case of outputting a resource identified by an URL to the display unit 109, the user device 20 transmits the viewing aggregation information 42 to the management server 12.

Next, technical ideas that can be understood from the above embodiments and other examples are additionally listed below.

[A] A program, causing one or a plurality of computers to function as:

a first output control unit that outputs a virtual space screen, including an image of a virtual space and a URL registration display for registering a URL of a resource associated with a link target in the virtual space, to a display unit;

an identification information registration unit that, in a case of accepting selection of the URL registration display by a user, records the URL of the resource associated with the link target in a storage unit, in a manner associated with the user;

an identification information acquisition unit that acquires the URL recorded in the storage unit in response to a callup instruction by the user;

a second output control unit that outputs a screen including a hyperlink of the URL acquired by the identification information acquisition unit as a separate screen from the virtual space screen;

a resource acquisition unit that accepts selection of the hyperlink by the user, and acquires the resource corresponding to the hyperlink; and a third output control unit that outputs a screen, using the resource that is acquired, to the display unit.

[B] The program according to [A], wherein the first output control unit outputs an avatar object corresponding to the user into the virtual space, and in a case in which an activity of the avatar object satisfies a display condition, outputs the URL registration display to the display unit.

[C] The program according to [B], wherein, in a case in which a position of the avatar object in the virtual space is included within a determination region, the first output control unit outputs the URL registration display to the display unit.

[D] The program according to any one of [A] to [C], wherein the user is a first user that distributes a moving image, the first output control unit outputs the virtual space screen to the display unit used by the first user, and also transmits drawing data for outputting the moving image to a second user device used by a second user, and in a case of accepting selection of the URL registration display by the first user, the identification information registration unit records the URL in the storage unit in a manner associated with the first user.

[E] The program according to any one of [A] to [C], wherein the identification information acquisition unit acquires the URL in response to the callup instruction by the first user, the second output control unit outputs the screen including the hyperlink of the URL that is acquired, as a screen that only the first user can confirm, the resource acquisition unit accepts the selection of the hyperlink by the first user, and acquires data for outputting the resource corresponding to the hyperlink, and the third output control unit outputs a screen using the resource that is acquired.

[F] The program according to any one of [A] to [C], wherein the identification information acquisition unit acquires the URL in response to the callup instruction by the first user, the second output control unit outputs the screen including the hyperlink based on the URL that is acquired, as a screen that the first user and the second user can confirm, the resource acquisition unit accepts the selection of the hyperlink by the first user, and acquires data for outputting the resource corresponding to the hyperlink, and the third output control unit outputs a screen using the resource that is acquired.

[G] The program according to any one of [A] to [F], wherein the user is a second user that watches a moving image distributed by a first user, the first output control unit receives, from a first user device used by the first user, drawing data for outputting the moving image, and outputs the virtual space screen including the URL registration display, in a case of accepting selection of the URL registration display by the second user, the identification information registration unit records the URL in the storage unit in a manner associated with the second user, the identification information acquisition unit acquires the URL in response to the callup instruction by the second user, the second output control unit outputs the screen including the hyperlink based on the URL that is acquired, as a separate screen from the virtual space screen, the resource acquisition unit accepts the selection of the hyperlink by the second user, and acquires data for outputting the resource corresponding to the hyperlink, and the third output control unit displays a screen using the resource that is acquired.

[G1] The program according to [G], wherein the link target is shared information that is displayed using an in-app browser on the basis of an operation by the first user, the first output control unit outputs a virtual space screen including the URL registration display that is associated with the shared information, and in a case of accepting selection of the URL registration display by the second user, the identification information registration unit records the URL of the resource that is associated with the shared information in the storage unit, in a manner associated with the second user.

[H] An information processing method of one or a plurality of computers executing:

first output control processing of outputting an image of a virtual space, and a virtual space screen including a URL registration display for registering a URL of a resource associated with a link target in the virtual space, to a display unit;

identification information registration processing of, in a case of accepting selection of the URL registration display by a user, recording the URL of the resource associated with the link target in a storage unit, in a manner associated with the user;

identification information acquisition processing of acquiring the URL recorded in the storage unit in response to a callup instruction by the user;

second output control processing of outputting a screen including a hyperlink of the URL that is acquired, as a separate screen from the virtual space screen;

resource acquisition processing of accepting selection of the hyperlink by the user, and acquiring the resource corresponding to the hyperlink; and third output control processing of outputting a screen, using the resource that is acquired, to the display unit.

[I]. A server, including:

a distribution management unit that transmits drawing data, for outputting an image of a virtual space, and a virtual space screen including a URL registration display for registering a URL associated with a link target in the virtual space to a display unit, to a user device used by a user;

a viewing history information reception unit that, after the URL acquired by the user selecting the URL registration display is recorded in a storage unit, receives viewing history information indicating that the user viewed a screen that uses a resource identified by the URL; and an achievement recording unit that, on the basis of the viewing history information, calculates a view count of the resource and records the view count in an achievement information storage unit as achievement information, for each of the link targets.

[J] The server according to [I], further including: an identification information registration unit that, in a case of the URL registration display being selected by the user, receives information from the user device used by the user indicating that the URL registration display is selected, records the URL associated with the URL registration display in the storage unit in a manner associated with the user, and also transmits, to the user device, the URL recorded in the storage unit, in response to a callup instruction received from the user device.

[K] The server according to [I] or [J], wherein the viewing history information reception unit receives selection information indicating that the user selected the URL registration display, and the achievement recording unit records the achievement information including a selection count that is a count of times of the URL registration display being selected, on the basis of the selection information.

[L] The server according to any one of [I] to [K], wherein the distribution management unit transmits data received from a first user device used by a first user that distributes a moving image to a second user device used by a second user that watches the moving image, and causes the moving image to be output to a display unit of the second user device, and the achievement recording unit records a reward corresponding to the achievement information in a manner associated with the first user.

[M] The server according to [L], wherein a reward with a higher value is recorded associated with the first user in conjunction with the view count becoming greater.

[O] An information processing method of a server, connected to a user device, executing:

distribution management processing of transmitting drawing data, for outputting an image of a virtual space, and a virtual space screen including a URL registration display for registering a URL associated with a link target in the virtual space to a display unit, to the user device used by the user;

viewing history information reception processing of, after the URL acquired by the user selecting the URL registration display being recorded in a storage unit, receiving viewing history information indicating that the user viewed a screen that uses a resource identified by the URL; and achievement recording processing of, on the basis of the viewing history information, calculating a view count of the resource and recording the view count in an achievement information storage unit as achievement information, for each of the link targets.

[P] An information processing system, including:

a first output control unit that outputs an image of a virtual space, and a virtual space screen including a URL registration display for registering a URL of a resource associated with a link target in the virtual space, to a display unit;

an identification information registration unit that, in a case of accepting selection of the URL registration display by a user, records the URL of the resource associated with the link target in a storage unit, in a manner associated with the user;

an identification information acquisition unit that acquires the URL recorded in the storage unit in response to a callup instruction by the user;

a second output control unit that displays a screen including a hyperlink of the URL acquired by the identification information acquisition unit as a separate screen from the virtual space screen;

a resource acquisition unit that accepts selection of the hyperlink by the user, and acquires the resource corresponding to the hyperlink; and a third output control unit that displays a screen, using the resource that is acquired, on the display unit.

[Q] A program, causing one or a plurality of computers to function as:

an activating unit that accepts an operation of a user and activates an in-app browser;

a sharing unit that, in a case of the user sharing information, transmits a sharing request to a server for sharing information displayed on the in-app browser with another device used by another user viewing a screen of virtual space;

a shared information display control unit that displays the information displayed on the in-app browser, on a display object situated in the virtual space, as shared information;

a registration display control unit that, in a case of the user being shared with information from the other user, displays a URL registration display that is displayed in association with the display object; and an identification information registration unit that accepts an operation of the user on the URL registration display, and records a URL of a resource associated with a link target in a storage unit, in a manner associated with the user.

What is claimed is:

1. An information processing method, comprising:

outputting a virtual space screen to a display, the virtual space screen including an image of a virtual space and a URL registration display for registering a URL of a resource associated with a link target in the virtual space;

recording in a memory, in a case that a selection of the URL registration display by a user is received, the URL of the resource associated with the link target in a manner associated with the user;

acquiring the URL recorded in the memory in response to a call-up instruction by the user;

outputting a screen, including a hyperlink of the acquired URL, as a separate screen from the virtual space screen;

accepting selection of the hyperlink by the user;

acquiring the resource corresponding to the hyperlink; and outputting a screen, using the acquired resource, to the display, wherein the virtual space includes first determination regions and second determination regions corresponding to each of a plurality of contents of the URL registration display, the first determination regions and the second determination regions are non-display transparent objects, and the method further comprises:

outputting an avatar object corresponding to the user into the virtual space;

in response to the avatar object coming into contact with one of the first determination regions, outputting the URL registration display in the virtual space, corresponding to the one of the first determination regions, to the display, wherein the URL registration display in the virtual space includes a plurality of display systems, each display system containing at least one display object including the URL registration display; and in response to selecting the at least one display object by the avatar object, displaying a link target associated with the URL registration display, the link target being a three-dimension object drawn in a state of being stopped within the virtual space.

2. The information processing method according to claim 1, wherein the user is a first user that distributes a moving image, and the information processing method further comprises:

outputting the virtual space screen to the display used by the first user;

transmitting drawing data for output of the moving image to a second user device used by a second user; and in a case that a selection of the URL registration display by the first user is received, recording the URL in the memory in a manner associated with the first user.

3. The information processing method according to claim 2, further comprising:

acquiring the URL in response to the call-up instruction by the first user;

outputting the screen including the hyperlink of the URL that is acquired, as a screen that only the first user can confirm;

accepting the selection of the hyperlink by the first user;

acquiring data for output of the resource corresponding to the hyperlink; and outputting a screen using the resource that is acquired.

4. The information processing method according to claim 2, further comprising:

acquiring the URL in response to the call-up instruction by the first user;

outputting the screen including the hyperlink based on the URL that is acquired, as a screen that the first user and the second user can confirm;

accepting the selection of the hyperlink by the first user;

acquiring data for outputting the resource corresponding to the hyperlink; and outputting a screen using the resource that is acquired.

5. The information processing method according to claim 1, wherein the user is a second user that watches a moving image distributed by a first user, and the information processing method further comprises:

receiving, from a first user device used by the first user, drawing data for output of the moving image;

outputting the virtual space screen including the URL registration display;

in a case of accepting selection of the URL registration display by the second user, recording the URL in the memory in a manner associated with the second user;

acquiring the URL in response to the call-up instruction by the second user;

outputting the screen including the hyperlink based on the URL that is acquired, as a separate screen from the virtual space screen;

accepting the selection of the hyperlink by the second user;

acquiring data for outputting the resource corresponding to the hyperlink; and displaying a screen using the resource that is acquired.

6. The information processing method according to claim 5, wherein the link target is shared information that is displayed using an in-app browser based on an operation by the first user, and the information processing method further comprises:

outputting a virtual space screen including the URL registration display that is associated with the shared information; and in a case of accepting selection of the URL registration display by the second user, recording the URL of the resource that is associated with the shared information in the memory, in a manner associated with the second user.

7. A non-transitory computer readable medium storing computer executable instructions which, when executed by processing circuitry, cause the processing circuitry to perform the information processing method according to claim 1.

8. A server, comprising:

processing circuitry configured to:

transmit drawing data, for an output of a virtual space screen to a display of a user device of a user, the virtual space screen including an image of a virtual space and a URL registration display for registering a URL associated with a link target in the virtual space;

receive, after a selection of the URL registration display by the user is received and is recorded in a memory, viewing history information which indicates whether the user has viewed a screen that uses a resource identified by the URL; and calculate, based on the viewing history information, a view count of the resource and record the view count in an achievement information memory as achievement information, for each of the link targets, wherein the virtual space includes first determination regions and second determination regions corresponding to each of a plurality of contents of the URL registration display, the first determination regions and the second determination regions are non-display transparent objects, and the processing circuitry is further configured to:

output an avatar object corresponding to the user into the virtual space, in response to the avatar object coming into contact with one of the first determination regions, outputting the URL registration display in the virtual space, corresponding to the one of the first determination regions, to the display, wherein the URL registration display in the virtual space further includes a plurality of display systems, each display system containing at least one display object including the URL registration display, and in response to selecting the at least one display object by the avatar object, display a link target associated with the URL registration display, the link target being a three-dimension object drawn in a state of being stopped within the virtual space.

9. The server according to claim 8, wherein in a case that the URL registration display is selected by the user, the processing circuitry is further configured to:

receive information from the user device indicating that the URL registration display is selected;

record the URL associated with the URL registration display in the memory in a manner associated with the user; and transmit, to the user device, the URL recorded in the memory, in response to a call-up instruction received from the user device.

10. The server according to claim 9, wherein the processing circuitry is further configured to:

receive selection information indicating that the user selected the URL registration display; and record the achievement information, including a selection count that is a count of times of the URL registration display being selected, based on the selection information.

11. The server according to claim 8, wherein the processing circuitry is further configured to:

transmit data received, from a first user device used by a first user that distributes a moving image, to a second user device used by a second user that watches the moving image, such that the moving image is output to a display of the second user device; and record a reward corresponding to the achievement information in a manner associated with the first user.

12. The server according to claim 11, wherein a reward with a higher value is recorded associated with the first user in conjunction with the view count becoming greater.

13. An information processing method of a server which interacts with a user device used by a user, the information processing method comprising:

transmitting drawing data, for an output of a virtual space screen to a display of the user device, the virtual space screen including an image of a virtual space and a URL registration display for registering a URL associated with a link target in the virtual space;

receiving, after a selection of the URL registration display by the user is received, viewing history information which indicates whether the user has viewed a screen that uses a resource identified by the URL; and calculating, based on the viewing history information, a view count of the resource and recording the view count in a memory as achievement information, for each of the link targets, wherein the virtual space includes first determination regions and second determination regions corresponding to each of a plurality of contents of the URL registration display, the first determination regions and the second determination regions are non-display transparent objects, and the method further comprises:

outputting an avatar object corresponding to the user into the virtual space;

in response to the avatar object coming into contact with one of the first determination regions, outputting the URL registration display in the virtual space, corresponding to the one of the first determination regions, to the display, wherein the URL registration display in the virtual space further includes a plurality of display systems, each display system containing at least one display object including the URL registration display, and in response to selecting the at least one display object by the avatar object, displaying a link target associated with the URL registration display, the link target being a three-dimension object drawn in a state of being stopped within the virtual space.

14. An information processing system, comprising:

processing circuitry configured to:

output a virtual space screen to a display, the virtual space screen including an image of a virtual space and a URL registration display for registering a URL of a resource associated with a link target in the virtual space;

record in a memory, in a case that a selection of the URL registration display by a user is received, the URL of the resource associated with the link target in a manner associated with the user;

acquire the URL recorded in the memory in response to a call-up instruction by the user;

output a screen, including a hyperlink of the acquired URL, as a separate screen from the virtual space screen;

accept selection of the hyperlink by the user and acquiring the resource corresponding to the hyperlink; and output a screen, using the acquired resource, to the display, wherein the virtual space includes first determination regions and second determination regions corresponding to each of a plurality of contents of the URL registration display, the first determination regions and the second determination regions are non-display transparent objects, and the processing circuitry is further configured to:

output an avatar object corresponding to the user into the virtual space;

in response to the avatar object coming into contact with one of the first determination regions, output the URL registration display in the virtual space, corresponding to the one of the first determination regions, to the display, wherein the URL registration display in the virtual space further includes a plurality of display systems, each display system containing at least one display object including the URL registration display, and in response to selecting the at least one display object by the avatar object, display a link target associated with the URL registration display, the link target being a three-dimension object drawn in a state of being stopped within the virtual space.

15. The information processing system of claim 14, further comprising the memory and the display.

16. The information processing method of claim 1, wherein the virtual space screen includes content corresponding to the URL registration display, and the URL registration display is included in the virtual space screen at a position corresponding to a position of the content.

17. The information processing method of claim 16, wherein the virtual space screen further includes the avatar corresponding to the user, and the position of the virtual space screen is spaced apart from a relative position of the avatar.

18. The information processing method of claim 1, wherein the screen, output using the acquired resource, is a webpage including images and user interface elements.

19. The information processing method according to claim 1, wherein the link target can be mounted on the avatar object.

20. The server according to claim 8, wherein the link target can be mounted on the avatar object.

* * * * *